(12) United States Patent
Konishi et al.

(10) Patent No.: US 7,642,525 B2
(45) Date of Patent: Jan. 5, 2010

(54) MICROSCOPE OBJECTIVE AND FLUORESCENT OBSERVATION APPARATUS THEREWITH

(75) Inventors: Hirokazu Konishi, Tokyo (JP); Yasushi Fujimoto, Tokyo (JP); Kenichi Kusaka, Tokyo (JP); Takashi Kasahara, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/245,532

(22) Filed: Oct. 3, 2008

(65) Prior Publication Data

US 2009/0032732 A1 Feb. 5, 2009

Related U.S. Application Data

(62) Division of application No. 11/999,600, filed on Dec. 6, 2007, now Pat. No. 7,486,445.

(30) Foreign Application Priority Data

Dec. 11, 2006 (JP) .............................. 2006-333338
Dec. 3, 2007 (JP) .............................. 2007-311963

(51) Int. Cl.
F21V 9/16 (2006.01)

(52) U.S. Cl. .................................................. 250/458.1

(58) Field of Classification Search .............. 250/458.1, 250/459.1, 461.1
See application file for complete search history.

(56) References Cited

U.S. PATENT DOCUMENTS

| | | | |
|---|---|---|---|
| 4,232,940 A | 11/1980 | Nakagawa | |
| 4,537,472 A | 8/1985 | Asoma | |
| 5,502,596 A | 3/1996 | Suzuki | |
| 5,517,360 A | 5/1996 | Suzuki | |
| 5,530,590 A | 6/1996 | Saito | |
| 5,532,878 A | 7/1996 | Suenaga et al. | |
| 5,659,425 A | 8/1997 | Suzuki | |
| 5,982,559 A | 11/1999 | Furutake | |
| 6,501,603 B2 | 12/2002 | Kasahara | |
| 6,504,653 B2 | 1/2003 | Matthae et al. | |
| 6,519,092 B2 | 2/2003 | Yamaguchi | |
| 6,560,032 B2 | 5/2003 | Hatano | |
| 6,693,742 B1 | 2/2004 | Winterot et al. | |
| 6,747,804 B2 | 6/2004 | Fujimoto et al. | |

(Continued)

FOREIGN PATENT DOCUMENTS

DE 19951482 A1 5/2001

(Continued)

Primary Examiner—David P Porta
Assistant Examiner—Kiho Kim
(74) Attorney, Agent, or Firm—Frishauf, Holtz, Goodman & Chick, P.C.

(57) ABSTRACT

An immersion type microscope objective is configured by, in order from the object side to an image side, a positive lens group Ga including a cemented lens obtained by cementing a plano-convex lens whose plane surface faces the object side to a meniscus lens whose concave surface faces the object side, and a positive single lens, a positive lens group Gb including a cemented lens, a lens group Gc including at least one cemented lens, a lens group Gd having a meniscus lens having a strongly concave surface that faces the image side, and a lens group Ge having a negative lens having a strongly concave surface that faces the object side.

17 Claims, 30 Drawing Sheets

U.S. PATENT DOCUMENTS

| | | |
|---|---|---|
| 7,046,451 B2 | 5/2006 | Mandai et al. |
| 7,199,938 B2 | 4/2007 | Fujimoto et al. |
| 7,224,523 B2 * | 5/2007 | Fukuyama et al. .......... 359/385 |
| 7,262,922 B2 | 8/2007 | Yamaguchi |
| 7,268,953 B2 | 9/2007 | Matthae et al. |
| 7,476,873 B2 * | 1/2009 | Hayashi .................... 250/458.1 |
| 2003/0043473 A1 | 3/2003 | Okuyama |
| 2006/0087745 A1 | 4/2006 | Fahlbusch et al. |
| 2006/0279847 A1 | 12/2006 | Matthae et al. |
| 2007/0091454 A1 | 4/2007 | Wartmann |

FOREIGN PATENT DOCUMENTS

| | | |
|---|---|---|
| DE | 101 08 796 A1 | 9/2002 |
| DE | 10 2004 051 357 A1 | 4/2006 |
| DE | 10 2005 027 423 A1 | 12/2006 |
| DE | 10 2005 051 025 A1 | 5/2007 |
| JP | 54-11755 A | 1/1979 |
| JP | 59-155822 A | 9/1984 |
| JP | 61-240218 A | 10/1986 |
| JP | 05-142477 A | 6/1993 |
| JP | 6-160720 A | 6/1994 |
| JP | 06-160721 A | 6/1994 |
| JP | 6-281864 A | 10/1994 |
| JP | 7-35983 A | 2/1995 |
| JP | 7-230038 A | 8/1995 |
| JP | 7-281097 A | 10/1995 |
| JP | 09-292373 A | 11/1996 |
| JP | 09-258107 A | 10/1997 |
| JP | 10-274742 A | 10/1998 |
| JP | 2000-035541 A | 2/2000 |
| JP | 2001-154101 A | 6/2001 |
| JP | 2001-272604 A | 10/2001 |
| JP | 2002-31760 A | 1/2002 |
| JP | 2002-098903 A | 4/2002 |
| JP | 2002-148519 A | 5/2002 |
| JP | 2002-341249 A | 11/2002 |
| JP | 2002-350734 A | 12/2002 |
| JP | 2003-015046 A | 1/2003 |
| JP | 2003-15047 A | 1/2003 |
| JP | 2003-21786 A | 1/2003 |
| JP | 2003-337285 A | 11/2003 |
| JP | 2004-061589 A | 2/2004 |
| JP | 2004-184826 A | 7/2004 |
| JP | 2005-266131 A | 9/2005 |
| JP | 2006-113287 A | 4/2006 |
| JP | 2006-113486 A | 4/2006 |
| JP | 2006-195125 A | 7/2006 |
| JP | 2006-259548 A | 9/2006 |
| JP | 2007-034020 A | 2/2007 |
| JP | 2007-121338 A | 5/2007 |

* cited by examiner

MICROSCOPE OBJECTIVE AND FLUORESCENT OBSERVATION APPARATUS THEREWITH

CROSS REFERENCE TO RELATED APPLICATIONS

The present application is a Divisional Application of U.S. application Ser. No. 11/999,600 filed Dec. 6, 2007 now U.S. Pat. No. 7,486,445, which claims the benefit of Japanese Application No. 2006-333338, filed Dec. 11, 2006, and No. 2007-311963, filed Dec. 3, 2007, the contents of which are incorporated by this reference.

BACKGROUND OF THE INVENTION

1. Field of the Invention

The present invention relates to the technology of a microscope objective and a fluorescent observation apparatus.

2. Description of the Related Art

Conventionally, fluorescent observation apparatuses are used in observing the behavior of molecules inside biological specimen with utilizing fluorescent tags. By connecting fluorescence with specific biological molecules, fluorescent tags can be used in observing the behavior, the coupling status, the moving status, etc. of molecules in a biological specimen. A fluorescent tag can be a fluorescent dye, a fluorescent protein, a quantum dot, etc.

One of the recent trends is observation with multicolored fluorescent tags. With the multicolored fluorescent tags, plural types of molecules can be discriminated in an observation, and complicated events such as an interaction of molecules in a living specimen.

Using the multicolored fluorescent tags, a wider range of wavelength is required in the fluorescent observation than in conventional observations.

In addition, wavelengths of 440 nm and 405 nm are used for photoactiovation fluorescent protein such as Kaede, PA-GFP, etc. Such short wavelength light has not been frequently used in the conventional applications. As a result, there is an increasing request for an objective aberration-corrected in a wider wavelength range than the conventional objective.

The target of the observation in a living specimen was the structure of the cells, but the target recently is tending toward the behavior of molecules. As a result, the resolution in the focal plane and the optical axis of microscopes is getting higher request. In addition, since confocal microscopes are popular, an observation can be performed with higher resolution. That is, there has also been request for an objective of high numerical aperture to attain higher resolution.

The Japanese Published Patent Application No. H7-35983 and the Japanese Published Patent Application No. 2003-21786 disclose microscope objectives with high numerical aperture appropriate for fluorescent observations.

SUMMARY OF THE INVENTION

The immersion type microscope objective as one of the embodiments of the present invention is configured by, in order from the object side to the image side, a positive lens group Ga, a positive lens group Gb, a lens group Gc, a lens group Gd, and a lens group Ge. The positive lens group Ga includes a cemented lens obtained by cementing a plano-convex lens whose plane surface faces the object side to a meniscus lens whose concave surface faces the object side, and a positive single lens. The positive lens group Gb is formed by a cemented lens. The lens group Gc includes one or more cemented lens. The lens group Gd includes a meniscus lens having a strongly concave surface that faces the image side. The lens group Ge includes a negative lens having a strongly concave surface that faces the object side. Assuming that H1 indicates the ray height of the marginal ray emergent from the lens group Gb, H2 indicates the ray height of the marginal ray incident to the lens group Gd, f indicates the focal length of the entire objective system, and f(Gb) indicates the focal length of the lens group Gb, the following conditions (1) and (2) are satisfied.

$$0.5 \leq H2/H1 \leq 0.75. \tag{1}$$

$$7.8 \leq |f(Gb)/f| \leq 20. \tag{2}$$

The fluorescent observation apparatus as one of the embodiments of the present invention includes: a light source; a beam splitting device selectively reflecting light from the light source; an objective for illuminating or observing a specimen; a stage for fixing the specimen; a wavelength selection device for selecting a desired wavelength range based on rays that pass through the beam splitting device; and a detector for detecting light that passes through the wavelength selection device. With the configuration, assume that $\lambda 1$ is the longest wavelength and $\lambda 2$ is the shortest wavelength in illuminating the specimen using two or more wavelengths, and $\Delta 1$ and $\Delta 2$ are the focal point of $\lambda 1$ and $\lambda 2$ respectively on the optical axis of the objective. Based on the assumption, the following conditions are satisfied.

$$\lambda 1 - \lambda 2 \geq 180 \text{ nm}. \tag{11}$$

$$|\Delta 1 - \Delta 2| < 0.2 \text{ }\mu\text{m}. \tag{12}$$

BRIEF DESCRIPTION OF THE DRAWINGS

The present invention will be more apparent from the following detailed description when the accompanying drawings are referenced.

DESCRIPTION OF THE PREFERRED EMBODIMENTS

Figure 1:
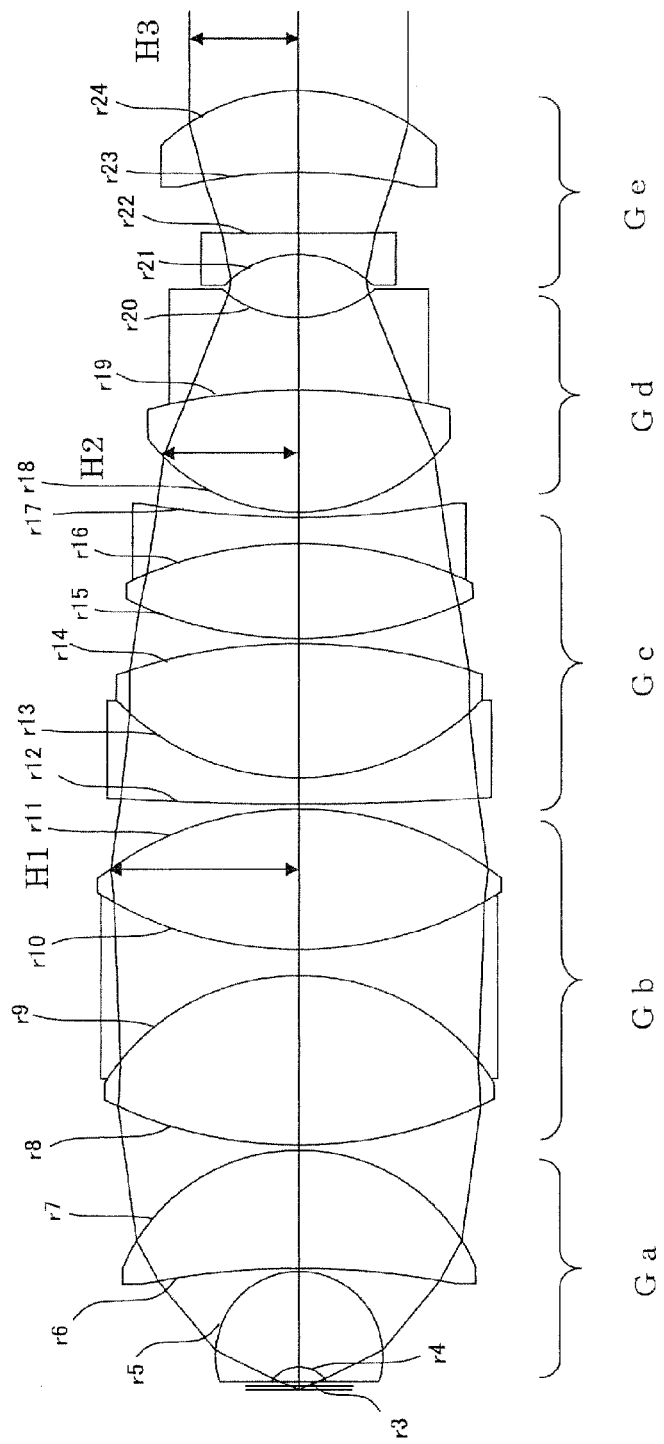
FIG. 1 is a sectional view of the objective according to the embodiment 1.

The immersion type microscope objective as one of the embodiments of the present invention is configured by, in order from the object side to the image side, a positive lens group Ga, a positive lens group Gb, a lens group Gc, a lens group Gd, and a lens group Ge. The positive lens group Ga includes a cemented lens obtained by cementing a plano-convex lens whose plane surface faces the object side to a meniscus lens whose concave surface faces the object side, and a positive single lens. The positive lens group Gb is formed by a cemented lens. The lens group Gc includes one or more cemented lens. The lens group Gd includes a meniscus lens having a strongly concave surface that faces the image side. The lens group Ge includes a negative lens having a strongly concave surface that faces the object side. Assuming that H1 indicates the ray height of the marginal ray emergent from the lens group Gb, H2 indicates the ray height of the marginal ray incident to the lens group Gd, f indicates the focal length of the entire objective, and f(Gb) indicates the focal length of the lens group Gb, the following conditions (1) and (2) are satisfied.

$$0.5 \leq H2/H1 \leq 0.75. \quad (1)$$

$$7.8 \leq |f(Gb)/f| \leq 20. \quad (2)$$

The condition (1) indicates the condition of appropriately correcting the axial chromatic aberration. Based on the condition (1), the ray height from the lens group Gb to the lens group Gd is regulated, and the axial chromatic aberration can be easily corrected. When the H2/H1 is lower than the left hand side of the condition (1), the ray height from the lens group Gb to the lens group Gd is too low, and it is difficult to correct the distortion or the comatic aberration. If the H2/H1 is higher than the right hand side of the condition (1), the ray height from the lens group Gb to the lens group Gd is too high, and it is hard to appropriately correct the axial chromatic aberration.

The condition (2) indicates the condition of appropriately correcting various aberrations such as a spherical aberration etc. Based on the condition (2), the power of the lens group Gb is regulated. If the |f(Gb)/f| is lower than the left hand side of the condition (2), the power of the lens group Gb is too strong, and the amount of generated spherical aberration is too large. If the |f(Gb)/f| is higher than the right hand side of the condition (2), then the power of the lens group Gb is too weak, it is difficult to satisfy the conditional expression (1), and the axial chromatic aberration cannot be appropriately corrected.

More advantageously, the following conditions (1)' and (2)' is satisfied.

$$0.55 \leq H2/H1 \leq 0.73. \quad (1)'$$

$$8 \leq |f(Gb)/f| \leq 20. \quad (2)'$$

The lens group Ge includes a negative lens Len whose concave surface faces the object side, and a positive lens Lep. If vd(Len) is defined as the Abbe number of the glass of the negative lens Len, and vd(Lep) is defined as the Abbe number of the glass of the positive lens Lep, then it is desired that the following conditional expression (3) is satisfied.

$$60 \geq vd(Len) - vd(Lep) \geq 25. \quad (3)$$

The condition (3) is to correct the chromatic aberration of the magnification by setting a large difference in Abbe number between the negative lens and the positive lens of the lens group Ge. If the left hand side of the condition is lower than 25, the chromatic aberration of the magnification cannot be sufficiently corrected. The compensation-free objective for correcting the axial chromatic aberration and the chromatic aberration of magnification using only an objective is allowed the flexibility in selecting combination units (image optics system and illumination optics system). More advantageously, the following conditions (3)' is satisfied.

$$45 \geq vd(Len) - vd(Lep) \geq 30. \quad (3)'$$

The optical glass of the positive lens Lep is an optical glass containing ingredient $Nb_2O_5$ or $Ta_2O_5$. When the refractive index of the d-line of the positive lens Lep is defined as nd(Lep), it is desired that the following conditions are satisfied.

$$1.65 \leq nd(Lep) \leq 1.8 \quad (4)$$

$$25 \leq vd(Lep) \leq 41 \quad (5)$$

To appropriately correct the comatic aberration and the chromatic aberration of the magnification, it is necessary that the positive lens Lep is made of an optical glass having a high refractive index and large chromatic dispersion (low Abbe number vd). The optical glasses containing ingredient $Nb_2O_5$ or $Ta_2O_5$ have a high refractive index and chromatic dispersion. Therefore, the comatic aberration and the chromatic aberration of the magnification can be appropriately corrected. Furthermore, these optical glasses have low autofluorescence and high transparency in the ultraviolet range. Therefore, it is possible to make an observation with high contrast and brightness in the fluorescent observation.

It is also desired that the lens group Gb is a cemented triplet of a positive lens, a negative lens, and a positive lens. The axial chromatic aberration can be appropriately corrected by arranging the cemented triplet in the lens group Gb having a high ray height of a marginal ray.

Furthermore, it is also desired to satisfy the following condition (6) when H3 is defined as the ray height of the marginal ray emergent from the lens group Ge.

$$0.5 \leq H3/H1 \leq 0.65 \quad (6)$$

The condition is set to appropriately correct various aberrations. If the H3/H1 is lower than the left hand side of the condition, then the power of the lens group Ga and the lens group Gb is too weak, strong power is required as the subsequent group to the lens group Gc, and the amount of generated aberrations becomes high. If the H3/H1 is higher than the right hand side of the condition, then the power of the lens group Ga and lens group Gb is too strong, and the amount of generated aberrations in the lens group Ga and the lens group Gb becomes large.

In addition, the positive lens group Ga includes: a cemented lens G1 obtained by cementing a plano-convex lens whose plane surface faces the object side to a meniscus lens whose concave surface faces the object side; a positive meniscus lens G2 whose concave surface faces the object side; and a positive single lens G3. Assuming that f(G1+G2) indicates the composite focal length of the cemented lens G1 and the meniscus lens G2, f indicates the focal length of the entire objective, and D indicates the length of the marginal ray between the cemented lens G1 and the meniscus lens G2, the configuration satisfying the following conditional expressions (7) and (8) is also desired.

$$1 \leq f(G1+G2)/f \leq 2 \quad (7)$$

$$D/f \leq 0.6 \quad (8)$$

To collect the dispersed luminous flux from the object, it is common that the lens group on the object side has strong power. Specifically, with the immersion type objective having high NA, the lens group closest to the object generally has the geometrically close to a hemisphere. However, if the lens group closest to the object is assigned high convergence power, the spherical aberration or the axial chromatic aberration generated there are too large and it is difficult to appropriately correct them. According to the present invention, the strong convergence effect assigned only to the lens group closest to the object is also assigned to the two lens groups, that is, the cemented lens GC and the meniscus lens G2, thereby reducing the amount of generated aberration, and increasing the lens surface for which the aberration is to be corrected.

The conditions (7) and (8) regulate the lens groups G1 and G2. If the f(G1+G2) is lower than left hand side of the condition (7), then the power of the lens groups G1 and G2 is too strong, and the amount of the spherical aberration and the amount of the axial chromatic aberration increase. If the f(G1+G2) is higher than the right hand side of the condition (7), then no sufficient convergence power can be obtained, the ray height in the subsequent lens groups becomes higher, and it is difficult to appropriately correct the spherical aberration and the axial chromatic aberration. If the D/f is higher than right hand side of the condition (8), the balance of the power between the lens groups G1 and G2 cannot be maintained and the aim to replace the conventional lens group with two lens groups cannot be attained. By satisfying the conditional expressions (7) and (8), the lens group G1 is alike to the shape of a hemisphere, and the lens group G2 also alike to the shape of a hemisphere. That is, there are two sagittally deep shape lenses. With the configuration, the load of the refractive power of the lens group G1 is also shared by the lens group G2, and the effect of the common difference of the thickness of the lens of the lens group G1 can be dispersed to the lens group G2, thereby improving the workability of the lens group G1.

Furthermore, the characteristic of the appearance of the objective as an embodiment of the present invention is that the radius of a curvature on the image side of the cemented lens G1 is less than the focal length, and the radius of a curvature on the image side of the meniscus lens G2 is less than two times the focal length f. Based on the characteristics, the ray height of and subsequent to the lens group G3 can be reduced, a high order aberration (spherical aberration, comatic aberration) can be easily corrected, and the outer diameter of the entire lens can be reduced, thereby improving the workability of the lens.

It is desired that the lens group Gc can be moved in the direction of the optical axis, and the following conditional expression (9) can be satisfied.

$$|f(Gc)/f| \leq 50 \quad (9)$$

Here, f indicates the focal length of the entire system, and f(Gc) indicates the focal length of the lens group Gc.

When an observation is made deeply in the cell of a living specimen (refractive index of 1.33 through 1.45), the generation of the spherical aberration caused by the difference in refractive index can be more efficiently suppressed by a smaller difference in refractive index between a cell and oil. However, if the refractive index of the oil is less than 1.51, the refractive index difference from the cover glass (nd=1.52426) is large. Therefore, when the thickness of the cover glass is shifted from 0.17 mm, a large spherical aberration occurs. The condition (9) is to correct the spherical aberration from the thickness of the cover glass and the spherical aberration from the refractive index difference between the cells of a living body (nd=1.33 through 1.45) and the oil. When the |f(Gc)/f| is higher than the right hand side of the condition (9), the spherical aberration cannot be sufficiently corrected.

It is also considered and desired that the following condition (10) can be satisfied in place of the conditional expression (9).

$$10 \leq |f(Gc)/f| \leq 20 \quad (10)$$

If the |f(Gc)/f| is lower than 10, then the power of the lens group Gc is too strong, and the amount of generated abovementioned in the lens group Gc increases. Furthermore, the amount of movement of the lens group Gc decreases, and the operability is degraded when a correction link for correcting the spherical aberration is used.

Next, the embodiment of the microscope objective according to the present invention is described below with reference to each embodiment.

In the embodiments, r is the radius of a curvature (in mm) of each lens surface, d is the interval (in mm) between lens surfaces, nd is the refractive index of the d-line of each lens, vd is the Abbe number in the d-line of each lens. β is the magnification, NA is the numerical aperture, WD is the operation distance (in mm), f is the focal length (in mm) of the entire system of an objective, f(G1+G2) is the composite focal length (in mm) of the first lens group and the second lens group, f(Ga) through f(Ge) are the focal lengths (in mm) of each lens group of the lens group Ga through the lens group Ge, H1 is the ray height (in mm) of the marginal rays emergent from the lens group Gb, H2 is the ray height (in mm) of the marginal rays incident to the lens group Gd, and H3 is the ray height (in mm) of the marginal rays on the emission side of the objective.

The optical glass used in each of the following embodiments described below is excellent in transparency in an ultraviolet range, an optical glass with less autofluorescence is selected, and each embodiment shows the optimum objective for a fluorescent observation. In addition, each optical glass is an environment-friendly glass (nonlead glass), and each embodiment is an objective in consideration for the environment.

The refractive index of each wavelength of each medium is described below.

|  | h-LINE | g-LINE | F-LINE | e-LINE | d-LINE | C-LINE | vd |
|---|---|---|---|---|---|---|---|
| WAVELENGTH (nm) | 404.656 | 435.835 | 486.13 | 546.07 | 587.56 | 656.27 |  |
| COVER GLASS | 1.54076 | 1.53629 | 1.53098 | 1.52656 | 1.52426 | 1.52133 | 54.3 |
| OIL 1 | 1.53735 | 1.53105 | 1.52373 | 1.51781 | 1.51483 | 1.51116 | 41.0 |
| OIL 2 | 1.41772 | 1.41409 | 1.40975 | 1.40615 | 1.40430 | 1.40197 | 52.0 |
| GLASS 1 | 1.52972 | 1.52617 | 1.52187 | 1.51822 | 1.51630 | 1.51383 | 64.2 |
| GLASS 2 | 1.92090 | 1.91048 | 1.89820 | 1.88813 | 1.88298 | 1.87654 | 40.8 |
| GLASS 3 | 1.60531 | 1.60099 | 1.59579 | 1.59139 | 1.58909 | 1.58615 | 61.1 |
| GLASS 4 | 1.58228 | 1.57869 | 1.57435 | 1.57070 | 1.56879 | 1.56638 | 71.4 |
| GLASS 5 | 1.50712 | 1.50443 | 1.50115 | 1.49837 | 1.49692 | 1.49506 | 81.5 |
| GLASS 6 | 1.66407 | 1.65693 | 1.64850 | 1.64154 | 1.63797 | 1.63345 | 42.4 |
| GLASS 7 | 1.44641 | 1.44439 | 1.44192 | 1.43983 | 1.43873 | 1.43731 | 95.2 |
| GLASS 8 | 1.49892 | 1.49591 | 1.49224 | 1.48911 | 1.48745 | 1.48531 | 70.3 |
| GLASS 9 | 1.77954 | 1.76771 | 1.75420 | 1.74341 | 1.73800 | 1.73130 | 32.2 |
| GLASS 10 | 1.46968 | 1.46675 | 1.46318 | 1.46014 | 1.45852 | 1.45642 | 67.8 |
| GLASS 11 | 1.61847 | 1.61436 | 1.60938 | 1.60518 | 1.60298 | 1.60016 | 65.4 |
| GLASS 12 | 1.63723 | 1.63071 | 1.62300 | 1.61664 | 1.61336 | 1.60922 | 44.5 |
| GLASS 13 | 1.63451 | 1.63010 | 1.62479 | 1.62033 | 1.61800 | 1.61504 | 63.3 |
| GLASS 14 | 1.84951 | 1.83517 | 1.81904 | 1.80633 | 1.80000 | 1.79224 | 29.8 |
| GLASS 15 | 1.79917 | 1.79197 | 1.78337 | 1.77621 | 1.77250 | 1.76780 | 49.6 |

Figure 21:
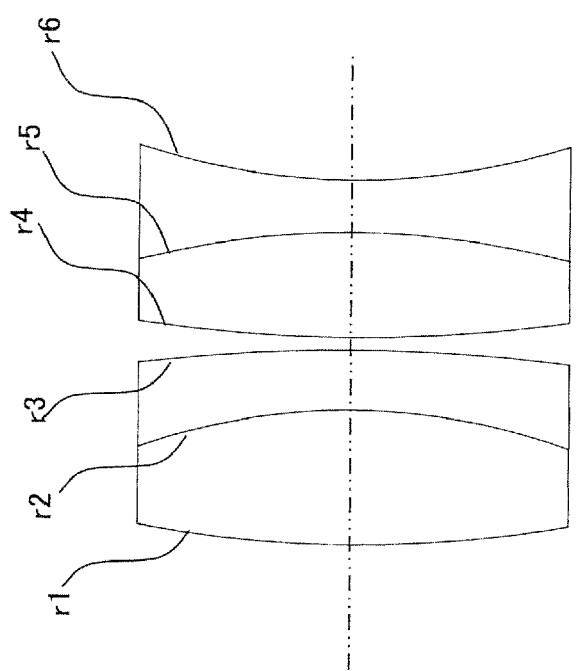
FIG. 21 is a sectional view of the tube lens A.
Figure 22:
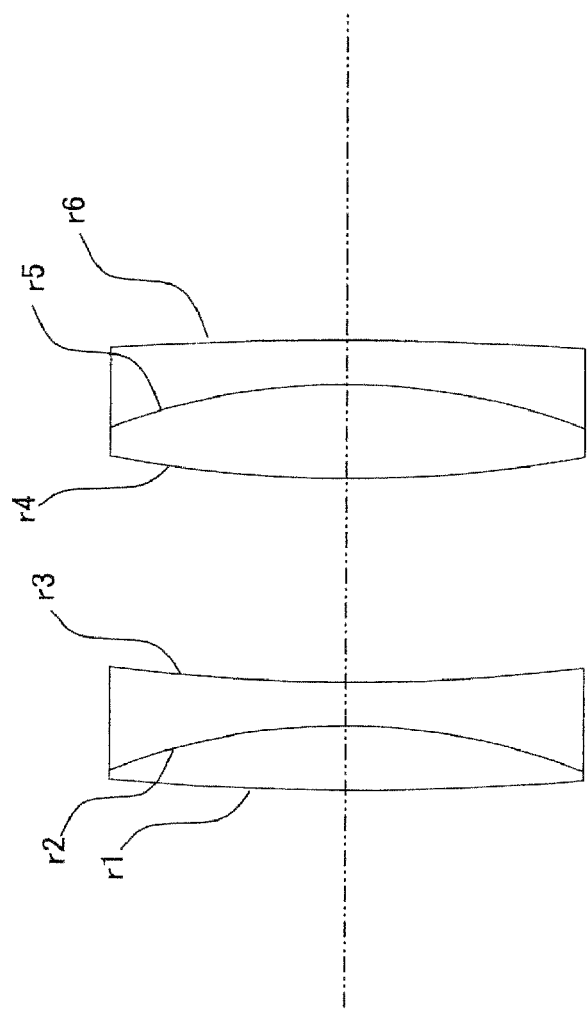
FIG. 22 is a sectional view of the tube lens B.

Each embodiment is an infinity correction type objective in which the rays emergent from the objective are parallel luminous flux, and does not form an image by itself. For example, the following tube lens A (focal length of 180 mm), or tube lens B (focal length of 180 mm) is used with embodiments. Here, FIG. 21 is a sectional view of the tube lens A, and FIG. 22 is a sectional view of the tube lens B.

(tube lens A)

| surface | r | d | nd | vd |
|---|---|---|---|---|
| 1 | 68.7541 | 7.7321 | 1.48749 | 70.23 |
| 2 | −37.5679 | 3.4742 | 1.80610 | 40.92 |
| 3 | −102.8477 | 0.6973 |  |  |
| 4 | 84.3099 | 6.0238 | 1.83400 | 37.16 |
| 5 | −50.7100 | 3.0298 | 1.64450 | 40.82 |
| 6 | 40.6619 |  |  |  |

(tube lens B)

| surface | r | d | nd | vd |
|---|---|---|---|---|
| 1 | 214.5976 | 5.7000 | 1.60300 | 65.44 |
| 2 | −52.2905 | 3.8192 | 1.51633 | 64.14 |
| 3 | 152.7590 | 17.9239 |  |  |
| 4 | 101.1841 | 8.2966 | 1.48749 | 70.23 |
| 5 | −54.0793 | 3.8834 | 1.61340 | 44.27 |
| 6 | −288.2268 |  |  |  |

When the tube lens A is used in combination, the interval between the objective in each embodiment and the tube lens A can be in the range from 50 mm to 170 mm. When the tube lens B is used in combination, the interval between the objective in each embodiment and the tube lens B can be in the range from 50 mm to 250 mm. The aberration in each embodiment shown below is obtained by combining with the tube lens A at the interval of 120 mm.

Here, the aberration diagrams are expressed in the objective plane which computed by the ray tracing in the direction from the image plane (photoreceptive plane) to the object plane (plane of the specimen), which include a spherical aberration, offence against the sine condition, a astigmatism, and a comatic aberration. From the aberration diagrams, the objective according to an embodiment of the present invention is appropriately corrected on the aberration such as the axial chromatic aberration, chromatic aberration of magnification, etc. from 405 nm to 656 nm.

Embodiment 1

The embodiment 1 according to the present invention has the configuration shown in FIG. 1. That is, it is configured by, in order from the object side to the image side, a positive lens group Ga, a positive lens group Gb, a lens group Gc, a lens group Gd, and a lens group Ge. The positive lens group Ga includes a cemented lens G1 including a plano-convex lens whose plane surface faces the object side and a meniscus lens whose concave surface faces the object side, and a positive single lens G2. The positive lens group Gb is formed by a cemented triplet G3 including a positive lens, a negative lens, and a positive lens. The lens group Gc is formed by a cemented lens G4 including a negative lens and a positive lens, and a cemented lens G5 including a positive lens and a negative lens. The lens group Gd is formed by a cemented lens G6 including a positive lens and a negative lens, and shaped a meniscus lens which has the strongly concave surface that faces the image side. The lens group Ge is formed by a negative lens G7 and a positive lens G8.

The lens data according to the embodiment 1 is listed below. The objective according to the embodiment 1 is used with the immersing solution of nd=1.51483, vd=41.0. The immersing solution is conventional oil for a microscope objective.

TABLE 1

| surface | r | d | nd | vd | Medium |
|---|---|---|---|---|---|
| 1 | INF | 0.1700 | 1.52426 | 54.3 | COVER GLASS |
| 2 | INF | 0.1600 | 1.51483 | 41.0 | OIL 1 |
| 3 | INF | 0.5300 | 1.51630 | 64.2 | GLASS 1 |
| 4 | −1.2824 | 3.6211 | 1.88298 | 40.8 | GLASS 2 |
| 5 | −3.1856 | 0.1200 | | | |
| 6 | −30.9403 | 4.4792 | 1.56879 | 71.4 | GLASS 4 |
| 7 | −7.3998 | 0.1983 | | | |
| 8 | 17.1268 | 6.4359 | 1.49692 | 81.5 | GLASS 5 |
| 9 | −8.9524 | 1.0000 | 1.61336 | 44.5 | GLASS 12 |
| 10 | 15.0118 | 5.3364 | 1.43873 | 95.2 | GLASS 7 |
| 11 | −12.8352 | 0.1998 | | | |
| 12 | 120.6880 | 1.0000 | 1.63797 | 42.4 | GLASS 6 |
| 13 | 9.8562 | 5.1029 | 1.43873 | 95.2 | GLASS 7 |
| 14 | −21.6730 | 0.2000 | | | |
| 15 | 15.4221 | 3.6001 | 1.43873 | 95.2 | GLASS 7 |
| 16 | −15.5126 | 1.0000 | 1.63797 | 42.4 | GLASS 6 |
| 17 | 34.3563 | 0.2000 | | | |
| 18 | 7.4348 | 4.6350 | 1.60298 | 65.4 | GLASS 11 |
| 19 | −23.8545 | 2.7618 | 1.63797 | 42.4 | GLASS 6 |
| 20 | 4.4583 | 2.3996 | | | |
| 21 | −3.9504 | 0.8000 | 1.61800 | 63.3 | GLASS 13 |
| 22 | 306.4907 | 2.3235 | | | |
| 23 | −19.2670 | 3.0954 | 1.80000 | 29.8 | GLASS 14 |
| 24 | −7.7632 | | | | |

β = 60x, NA = 1.4, field number = 22, WD = 0.16, f = 3
f(Ga) = 4.809
f(Gb) = 27.656
f(Gc) = 156.491
f(Gd) = −97.432
f(Ge) = −32.359
f(Ga) = 1.60
f(Gb) = 9.22
f(Gc) = 52.16
f(Gd) = −32.48
f(Ge) = −10.79
H1 = 7.27
H2 = 5.2
H3 = 4.2
vd (Len) = 63.3
vd (Lep) = 29.8
nd (Len) = 1.61800
nd (Lep) = 1.80000
(1) H2/H1 = 0.72
(2) f(Gb)/f = 9.22
(3) vd (Len) − vd (Lep) = 33.5
(6) H3/H1 = 0.58

Figure 2:
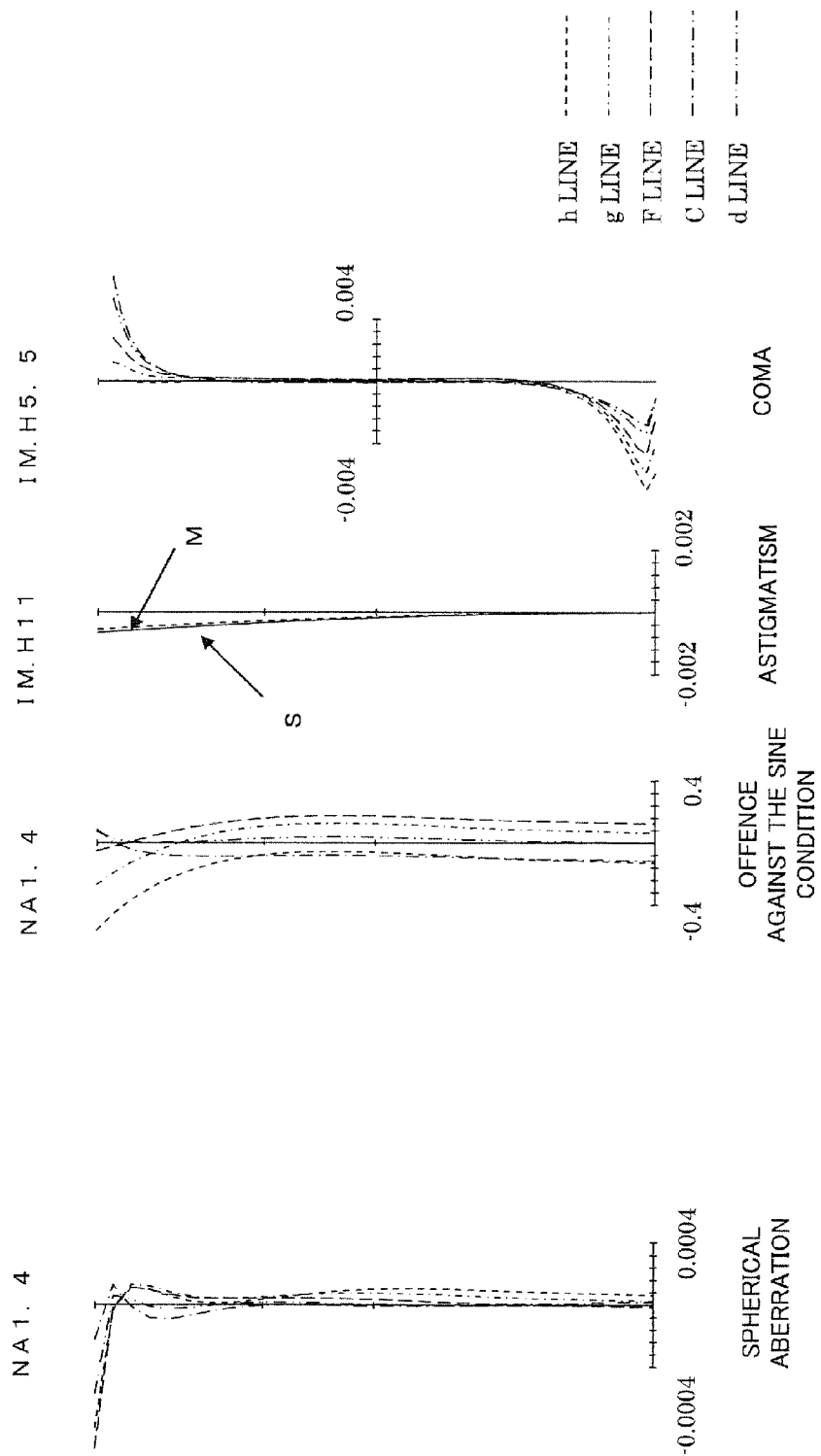
FIG. 2 shows the aberration of the objective according to the embodiment 1.

With the above-mentioned configuration, the aberration correction on the chromatic aberration and various aberrations are corrected in the wavelength range from 405 nm to 656 nm according to the present embodiment. The aberration correction is shown in FIG. 2.

Embodiment 2

Figure 3:
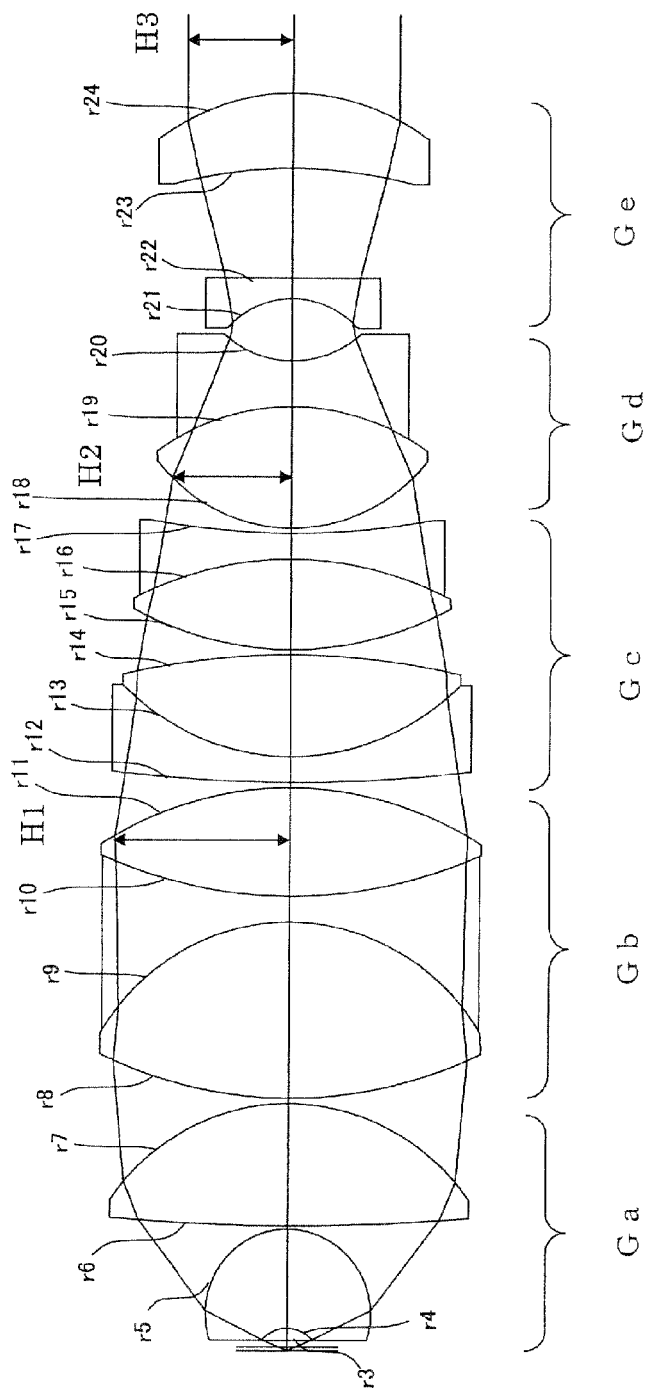
FIG. 3 is a sectional view of the objective according to the embodiment 2.

The embodiment 2 according to the present invention has the configuration shown in FIG. 3. That is, it is configured by, in order from the object side to the image side, a positive lens group Ga, a positive lens group Gb, a lens group Gc, a lens group Gd, and a lens group Ge. The positive lens group Ga includes a cemented lens G1 including a piano-convex lens whose plane surface faces the object and a meniscus lens whose concave surface faces the object side, and a positive single lens G2. The positive lens group Gb is formed by a cemented triplet G3 including a positive lens, a negative lens, and a positive lens. The lens group Gc is formed by a cemented lens G4 including a negative lens and a positive lens, and a cemented lens G5 including a positive lens and a negative lens. The lens group Gd is formed by a cemented lens G6 including a positive lens and a negative lens, and shaped a meniscus lens which has the strongly concave surface that faces the image side. The lens group Ge is formed by a negative lens G7 and a positive lens G8.

The lens data according to the embodiment 2 is listed below. The objective according to the embodiment 2 is used with the immersing solution of nd=1.51483, vd=41.0. The immersing solution is conventional oil for a microscope objective.

TABLE 2

| surface | r | d | nd | vd | Medium |
|---|---|---|---|---|---|
| 1 | INF | 0.1700 | 1.52426 | 54.3 | COVER GLASS |
| 2 | INF | 0.1600 | 1.51483 | 41.0 | OIL 1 |
| 3 | INF | 0.5300 | 1.51630 | 64.2 | GLASS 1 |
| 4 | −1.3252 | 3.8164 | 1.88298 | 40.8 | GLASS 2 |
| 5 | −3.2544 | 0.1200 | | | |
| 6 | 77.8515 | 4.7160 | 1.49692 | 81.5 | GLASS 5 |
| 7 | −8.4959 | 0.1983 | | | |
| 8 | 16.9794 | 6.8055 | 1.49692 | 81.5 | GLASS 5 |
| 9 | −8.5793 | 1.0000 | 1.61336 | 44.5 | GLASS 12 |
| 10 | 18.1665 | 4.1918 | 1.43873 | 95.2 | GLASS 7 |
| 11 | −13.7643 | 0.2004 | | | |
| 12 | 58.7464 | 1.0000 | 1.63797 | 42.4 | GLASS 6 |
| 13 | 9.2538 | 3.9412 | 1.43873 | 95.2 | GLASS 7 |
| 14 | −29.3071 | 0.2000 | | | |
| 15 | 13.0273 | 3.4902 | 1.43873 | 95.2 | GLASS 7 |
| 16 | −13.4308 | 1.0000 | 1.63797 | 42.4 | GLASS 6 |
| 17 | 30.3754 | 0.1996 | | | |
| 18 | 6.7126 | 4.6876 | 1.60298 | 65.4 | GLASS 11 |
| 19 | −9.0871 | 1.7678 | 1.63797 | 42.4 | GLASS 6 |
| 20 | 4.0409 | 2.4000 | | | |
| 21 | −3.5269 | 0.8000 | 1.48745 | 70.3 | GLASS 8 |
| 22 | INF | 4.2261 | | | |
| 23 | −18.8036 | 2.9073 | 1.80000 | 29.8 | GLASS 14 |
| 24 | −8.8041 | | | | |

β = 60x, NA = 1.4, field number = 22, WD = 0.16, f = 3
f(Ga) = 4.587
f(Gb) = 28.014
f(Gc) = 158.735
f(Gd) = −68.519
f(Ge) = −36.452
f(Ga) = 1.53
f(Gb) = 9.34
f(Gc) = 52.91
f(Gd) = −22.84
f(Ge) = −12.15
H1 = 6.91
H2 = 4.72
H3 = 4.2
vd (Len) = 70.3
vd (Lep) = 29.8
nd (Len) = 1.48745
nd (Lep) = 1.80000
(1) H2/H1 = 0.68
(2) f(Gb)/f = 9.34
(3) vd (Len) − vd (Lep) = 40.5
(6) H3/H1 = 0.61
(9) |f(Gc)/f| = 52.9

Figure 4:
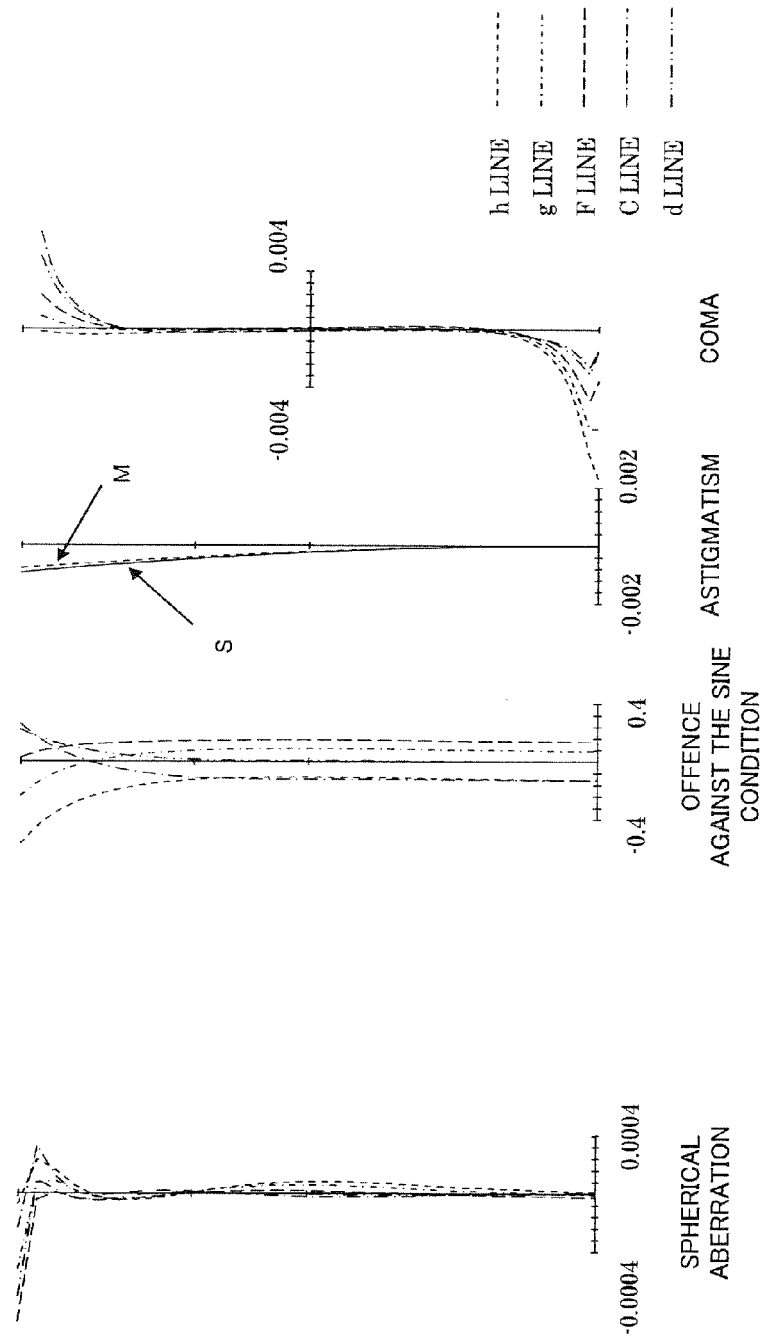
FIG. 4 shows the aberration of the objective according to the embodiment 2.

With the above-mentioned configuration, the aberration correction on the chromatic aberration and various aberrations are corrected in the wavelength range from 405 nm to 656 nm according to the present embodiment. The aberration correction is shown in FIG. 4.

Embodiment 3

Figure 5:
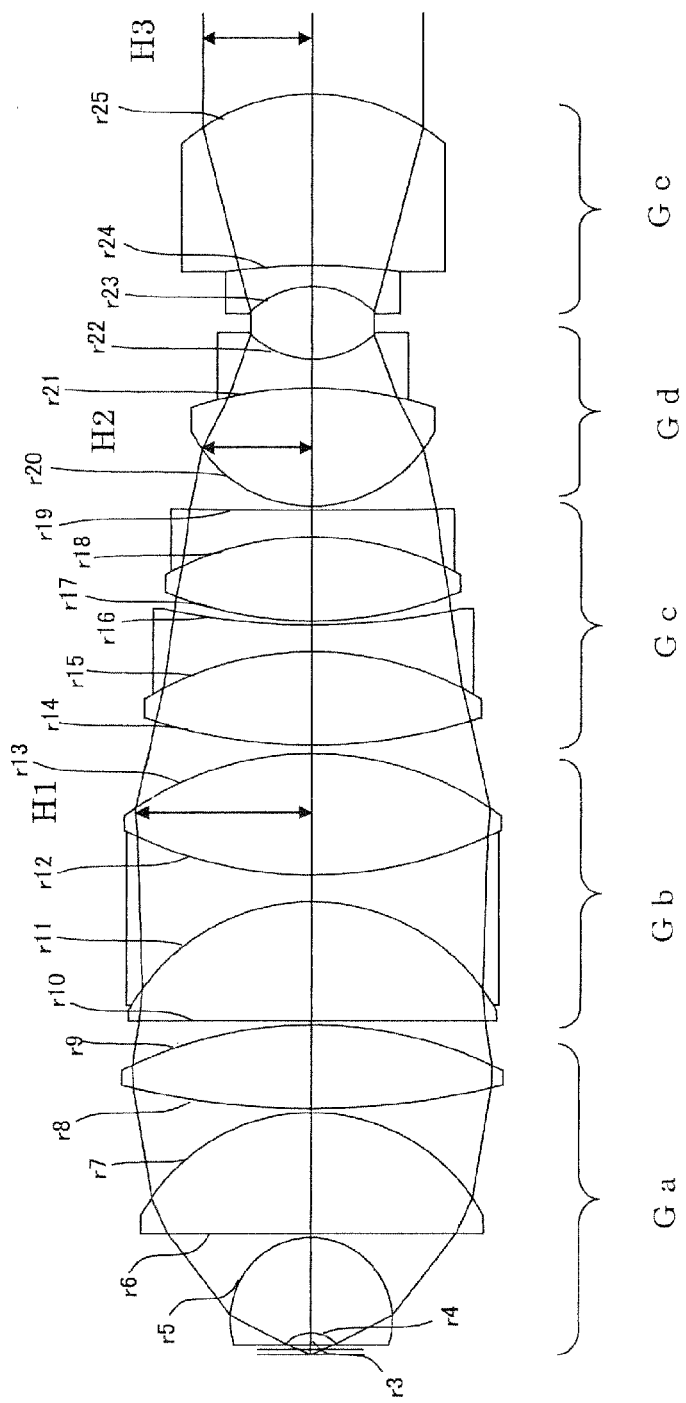
FIG. 5 is a sectional view of the objective according to the embodiment 3.

The embodiment 3 according to the present invention has the configuration shown in FIG. 5. That is, it is configured by, in order from the object side to the image side, a positive lens group Ga, a positive lens group Gb, a lens group Gc, a lens group Gd, and a lens group Ge. The positive lens group Ga includes a cemented lens G1 including a plano-convex lens whose plane surface faces the object side and a meniscus lens whose concave surface faces the object side, a positive single lens G2, and a positive single lens G3. The positive lens group Gb is formed by a cemented triplet G4 including a positive lens, a negative lens, and a positive lens. The lens group Gc is formed by a cemented lens G5 including a negative lens and a positive lens, and a cemented lens G6 including a positive lens and a negative lens. The lens group Gd is formed by a cemented lens G7 including a positive lens and a negative lens, and shaped a meniscus lens which has the strongly concave surface that faces the image side. The lens group Ge is formed by a cemented lens G8 including a negative lens and a positive lens. The lens data according to the embodiment 3 is listed below. The objective according to the embodiment 3 is used with the immersing solution of nd=1.51483, vd=41.0. The immersing solution is conventional oil for a microscope objective.

TABLE 3

| surface | r | d | nd | vd | Medium |
|---|---|---|---|---|---|
| 1 | INF | 0.1700 | 1.52426 | 54.3 | COVER GLASS |
| 2 | INF | 0.1600 | 1.51483 | 41.0 | OIL 1 |
| 3 | INF | 0.4800 | 1.51630 | 64.2 | GLASS 1 |
| 4 | −1.3140 | 3.5370 | 1.88298 | 40.8 | GLASS 2 |
| 5 | −3.0604 | 0.1496 | | | |
| 6 | INF | 4.4943 | 1.43873 | 95.2 | GLASS 7 |
| 7 | −7.3891 | 0.1498 | | | |
| 8 | 30.0757 | 3.1123 | 1.43873 | 95.2 | GLASS 7 |
| 9 | −16.1821 | 0.1495 | | | |
| 10 | INF | 4.4336 | 1.49692 | 81.5 | GLASS 5 |
| 11 | −8.0129 | 1.0000 | 1.63797 | 42.4 | GLASS 6 |
| 12 | 15.9529 | 4.5207 | 1.49692 | 81.5 | GLASS 5 |
| 13 | −12.1334 | 0.3151 | | | |
| 14 | 20.1446 | 3.4835 | 1.43873 | 95.2 | GLASS 7 |
| 15 | −12.4307 | 1.0000 | 1.63797 | 42.4 | GLASS 6 |
| 16 | 26.5927 | 0.1497 | | | |
| 17 | 14.8592 | 3.1218 | 1.49692 | 81.5 | GLASS 5 |
| 18 | −11.8346 | 1.0000 | 1.63797 | 42.4 | GLASS 6 |
| 19 | 246.5698 | 0.1497 | | | |
| 20 | 5.1806 | 4.3972 | 1.49692 | 81.5 | GLASS 5 |
| 21 | −15.1849 | 1.0823 | 1.77250 | 49.6 | GLASS 1 |
| 22 | 3.4182 | 2.6989 | | | |
| 23 | −3.3601 | 0.7917 | 1.48745 | 70.3 | GLASS 8 |
| 24 | −21.5242 | 6.3630 | 1.73800 | 32.2 | GLASS 9 |
| 25 | −7.6321 | | | | |

β = 60x, NA = 1.4, field number = 22, WD = 0.16, f = 3
f(Ga) = 4.057
f(Gb) = 55.132
f(Gc) = 424.929
f(Gd) = −14.706
f(Ge) = 425.459
f(Ga) = 1.35
f(Gb) = 18.38
f(Gc) = 141.64
f(Gd) = −4.90
f(Ge) = 141.82
H1 = 6.7
H2 = 4.19
H3 = 4.2

TABLE 3-continued vd (Len) = 70.3
vd (Lep) = 32.2
nd (Len) = 1.48745
nd (Lep) = 1.73800
(1) H2/H1 = 0.63
(2) f(Gb)/f = 18.38
(3) vd (Len) − vd (Lep) = 38.1
(6) H3/H1 = 0.63
(9) |f(Gc)/f| = 141.6

Figure 6:
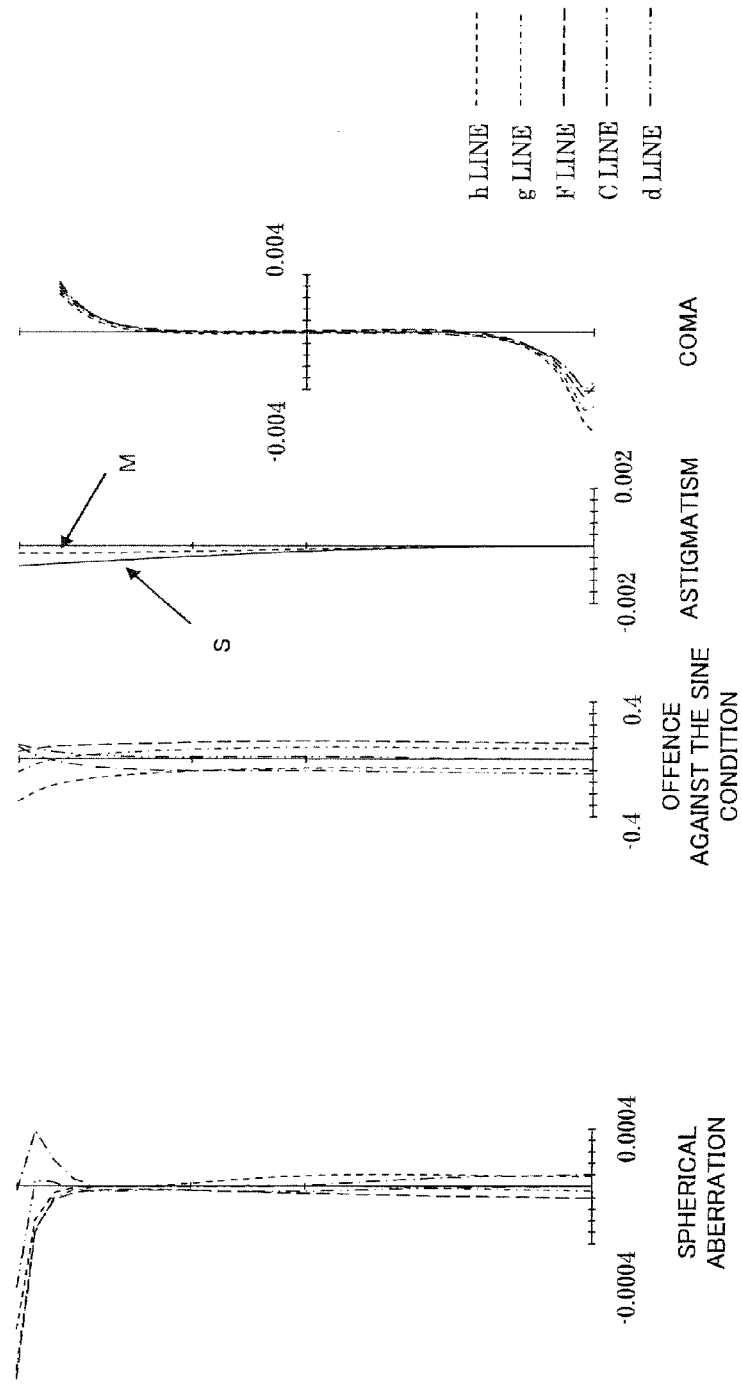
FIG. 6 shows the aberration of the objective according to the embodiment 3.

With the above-mentioned configuration, the aberration correction on the chromatic aberration and various aberrations are corrected in the wavelength range from 405 nm to 656 nm according to the present embodiment. The aberration correction is shown in FIG. 6.

Embodiment 4

Figure 7:
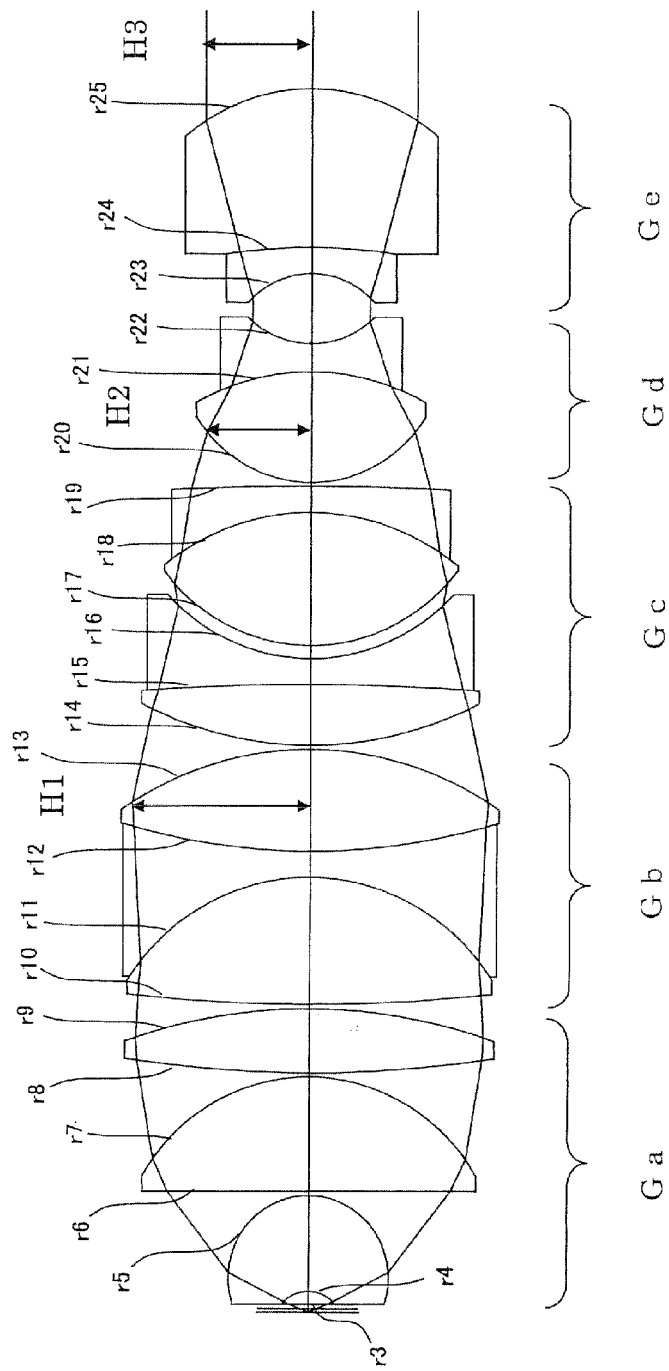
FIG. 7 is a sectional view of the objective according to the embodiment 4.

The embodiment 4 according to the present invention has the configuration shown in FIG. 7. That is, it is configured by, in order from the object side to the image side, a positive lens group Ga, a positive lens group Gb, a lens group Gc, a lens group Gd, and a lens group Ge. The positive lens group Ga includes a cemented lens G1 including a plano-convex lens whose plane surface faces the object side and a meniscus lens whose concave surface faces the object side, a positive single lens G2, and a positive single lens G3. The positive lens group Gb is formed by a cemented triplet G4 including a positive lens, a negative lens, and a positive lens. The lens group Gc is formed by a cemented lens G5 including a negative lens and a positive lens, and a cemented lens G6 including a positive lens and a negative lens. The lens group Gd is formed by a cemented lens G7 including a positive lens and a negative lens, and shaped a meniscus lens which has the strongly concave surface that faces the image side. The lens group Ge is formed by a cemented lens G8 including a negative lens and a positive lens. The lens data according to the embodiment 4 is listed below. The objective according to the embodiment 4 is used with the immersing solution of nd=1.51483, vd=41.0. The immersing solution is conventional oil for a microscope objective.

TABLE 4

| surface | r | d | nd | vd | Medium |
|---|---|---|---|---|---|
| 1 | INF | 0.1700 | 1.52426 | 54.3 | COVER GLASS |
| 2 | INF | 0.1598 | 1.51483 | 41.0 | OIL 1 |
| 3 | INF | 0.4800 | 1.51630 | 64.2 | GLASS 1 |
| 4 | −1.3953 | 3.6786 | 1.88298 | 40.8 | GLASS 2 |
| 5 | −3.1587 | 0.1484 | | | |
| 6 | INF | 4.4169 | 1.43873 | 95.2 | GLASS 7 |
| 7 | −7.5017 | 0.1497 | | | |
| 8 | 46.9496 | 2.4748 | 1.43873 | 95.2 | GLASS 7 |
| 9 | −21.4389 | 0.1609 | | | |
| 10 | 64.4978 | 4.9058 | 1.49692 | 81.5 | GLASS 5 |
| 11 | −8.4012 | 1.0000 | 1.63797 | 42.4 | GLASS 6 |
| 12 | 25.5835 | 3.9330 | 1.49692 | 81.5 | GLASS 5 |
| 13 | −12.8982 | 0.1496 | | | |
| 14 | 14.3371 | 2.3534 | 1.43873 | 95.2 | GLASS 7 |
| 15 | −89.1399 | 1.0000 | 1.63797 | 42.4 | GLASS 7 |
| 16 | 7.6109 | 0.5000 | | | |
| 17 | 7.1829 | 5.1309 | 1.49692 | 81.5 | GLASS 5 |
| 18 | −9.1388 | 1.0000 | 1.63797 | 42.4 | GLASS 6 |
| 19 | −118.5923 | 0.1499 | | | |
| 20 | 5.2788 | 4.2673 | 1.49692 | 81.5 | GLASS 5 |
| 21 | −9.2055 | 1.0823 | 1.77250 | 49.6 | GLASS 15 |
| 22 | 3.5809 | 2.6995 | | | |
| 23 | −3.3555 | 1.0007 | 1.48745 | 70.3 | GLASS 8 |
| 24 | −22.6626 | 6.1219 | 1.73800 | 32.2 | GLASS 9 |

TABLE 4-continued

| 25 | −7.6084 |
|---|---|

β = 60x, NA = 1.4, field number = 22, WD = 0.16, f = 3
f(Ga) = 4.178
f(Gb) = 39.814
f(Gc) = 133.751
f(Gd) = −13.142
f(Ge) = 350.726
f(Ga) = 1.39
f(Gb) = 13.27
f(Gc) = 44.58
f(Gd) = −4.38
f(Ge) = 116.91
H1 = 6.96
H2 = 4.1
H3 = 4.2
vd (Len) = 70.3
vd (Lep) = 32.2
nd (Len) = 1.48745
nd (Lep) = 1.73800
(1) H2/H1 = 0.59
(2) f(Gb)/f = 13.27
(3) vd (Len) − vd (Lep) = 38.1
(6) H3/H1 = 0.60

Figure 8:
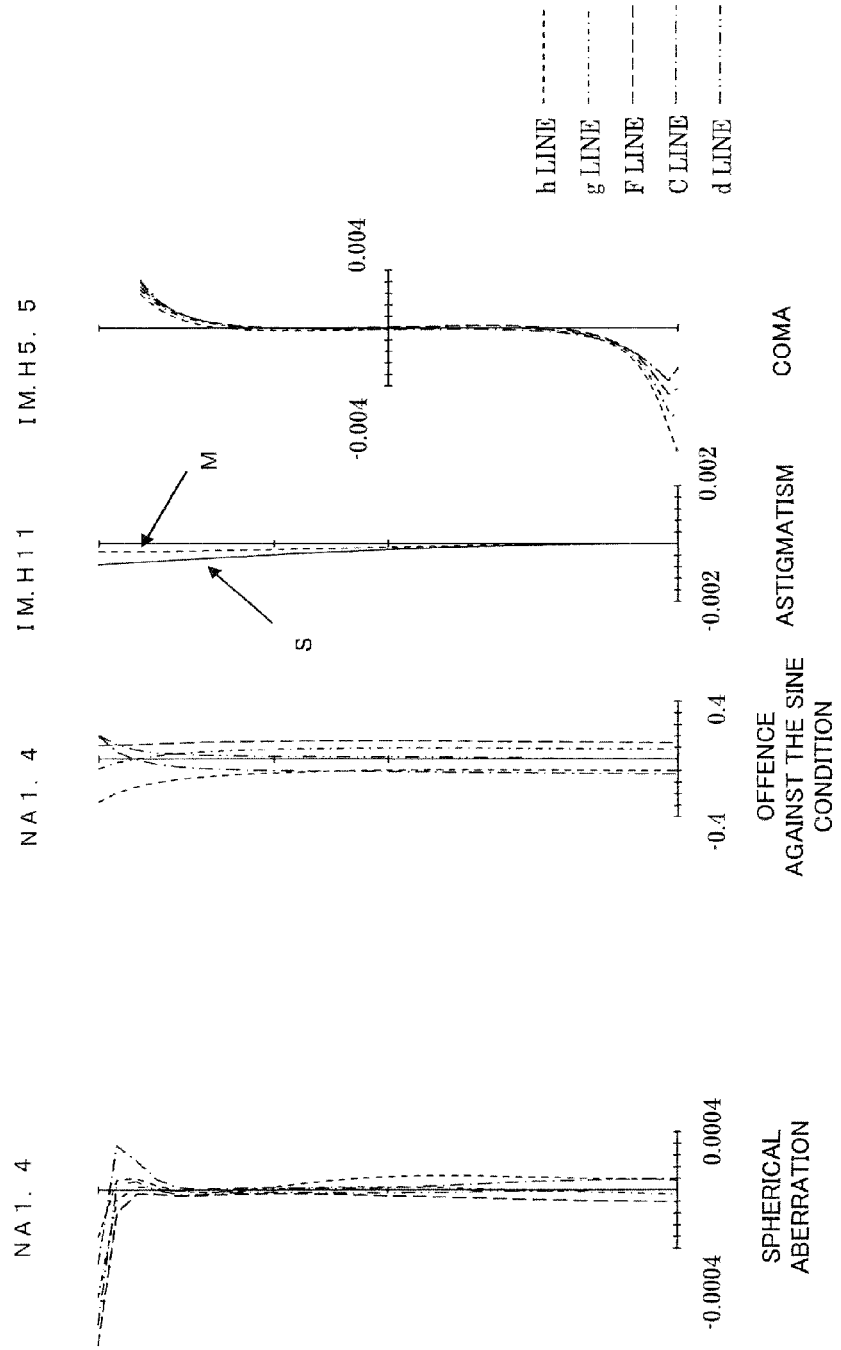
FIG. 8 shows the aberration of the objective according to the embodiment 4.

With the above-mentioned configuration, the aberration correction on the chromatic aberration and various aberrations are corrected in the wavelength range from 405 nm to 656 nm according to the present embodiment. The aberration correction is shown in FIG. 8.

Embodiment 5

Figure 9:
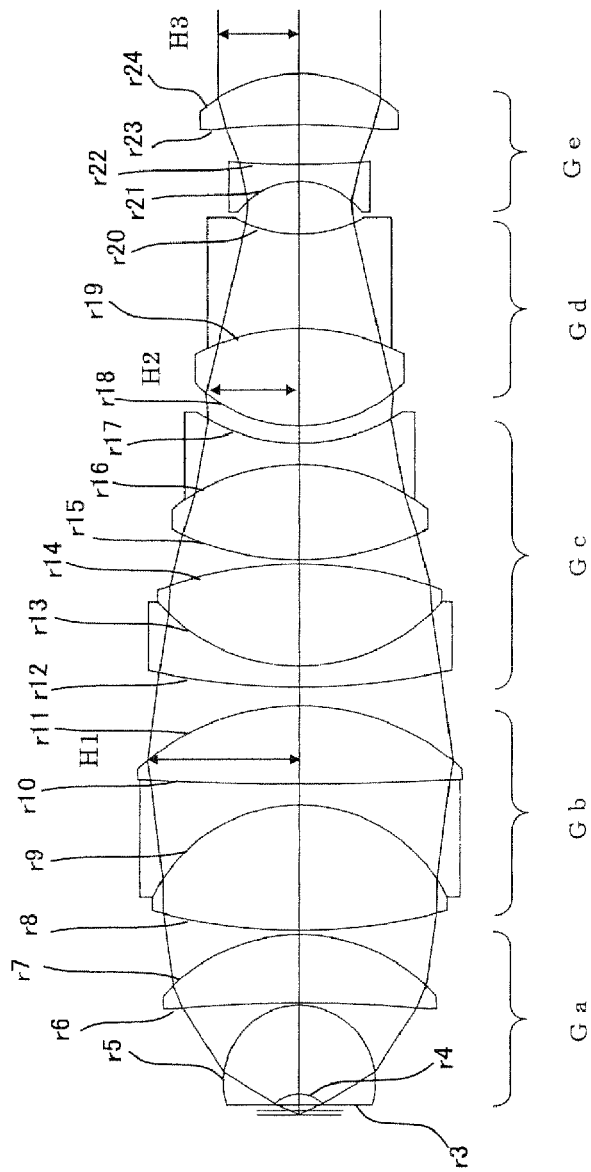
FIG. 9 is a sectional view of the objective according to the embodiment 5.

The embodiment 5 according to the present invention has the configuration shown in FIG. 9. That is, it is configured by, in order from the object side to the image side, a positive lens group Ga, a positive lens group Gb, a lens group Gc, a lens group Gd, and a lens group Ge. The positive lens group Ga includes a cemented lens G1 including a plano-convex lens whose plane surface faces the object side and a meniscus lens whose concave surface faces the object side, and a positive single lens G2. The positive lens group Gb is formed by a cemented triplet G3 including a positive lens, a negative lens, and a positive lens. The lens group Gc is formed by a cemented lens G4 including a negative lens and a positive lens, and a cemented lens G5 including a positive lens and a negative lens. The lens group Gd is formed by a cemented lens G6 including a positive lens and a negative lens, and shaped a meniscus lens which has the strongly concave surface that faces the image side. The lens group Ge is formed by a negative lens G7 and a positive lens G8. The lens group Gc can move in the direction of the optical axis.

The data according to the embodiment 5 is listed below. The objective according to the embodiment 5 is used with the immersion liquid of nd=1.40430, vd=52.0. The immersion liquid can be silicone oil. The refractive index of the silicone oil is close to the refractive index of the cells of a living specimen (nd=1.33 through 1.45), and there is few refractive index mismatch between the silicone oil and the cells of a living specimen. Therefore, the objective using silicone oil has the advantage that the cells of a living body can be clearly and deeply observed. In addition, it has less autofluorescence, and is appropriate for a fluorescent observation. Furthermore, since it is not volatile and not easily changed in refractive index, it is appropriate for a long-time observation. On the other hand, a commonly used glycerin immersing solution and an immersing solution as a mixture of glycerin and water are inappropriate for a long-time observation because the absorbent glycerin changes its refractive index with the lapse of time.

TABLE 5

| surface | r | d | nd | vd | Medium |
|---|---|---|---|---|---|
| 1 | INF | 0.1700 | 1.52426 | 54.3 | COVER GLASS |
| 2 | INF | 0.3200 | 1.40430 | 52.0 | OIL 2 |
| 3 | INF | 0.5000 | 1.45852 | 67.8 | GLASS 10 |
| 4 | −1.6496 | 4.2001 | 1.88298 | 40.8 | GLASS 2 |
| 5 | −3.6502 | 0.1200 | | | |
| 6 | −62.3111 | 3.2272 | 1.60298 | 65.4 | GLASS 11 |
| 7 | −8.8442 | 0.2000 | | | |
| 8 | 26.7434 | 5.9486 | 1.49692 | 81.5 | GLASS 5 |
| 9 | −7.9276 | 1.0000 | 1.63797 | 42.4 | GLASS 6 |
| 10 | 132.5259 | 3.7073 | 1.43873 | 95.2 | GLASS 7 |
| 11 | −11.6369 | 0.8820 | | | |
| 12 | 33.2939 | 1.0000 | 1.63797 | 42.4 | GLASS 6 |
| 13 | 9.1275 | 4.8510 | 1.43873 | 95.2 | GLASS 7 |
| 14 | −19.5522 | 0.2000 | | | |
| 15 | 13.6626 | 4.5169 | 1.43873 | 95.2 | GLASS 7 |
| 16 | −9.9845 | 1.0000 | 1.63797 | 42.4 | GLASS 6 |
| 17 | 8.8271 | 0.8290 | | | |
| 18 | 7.1623 | 4.6101 | 1.60298 | 65.4 | GLASS 11 |
| 19 | −11.0412 | 4.4761 | 1.63797 | 42.4 | GLASS 6 |
| 20 | 6.4981 | 2.5000 | | | |
| 21 | −3.7952 | 0.8000 | 1.51630 | 64.2 | GLASS 1 |
| 22 | 40.4882 | 1.8956 | | | |
| 23 | −35.9211 | 2.4061 | 1.73800 | 32.2 | GLASS 9 |
| 24 | −7.24980 | | | | |

β = 60x, NA = 1.3, field number = 22, WD = 0.32, f = 3
f(Ga) = 5.006
f(Gb) = 28.159
f(Gc) = −43.184
f(Gd) = 34.104
f(Ge) = −68.746
f(Ga) = 1.67
f(Gb) = 9.39
f(Gc) = −14.39
f(Gd) = 11.37
f(Ge) = −22.92
H1 = 7.32
H2 = 4.49
H3 = 3.9
vd (Len) = 64.2
vd (Lep) = 32.2
nd (Len) = 1.51630
nd (Lep) = 1.73800
(1) H2/H1 = 0.61
(2) f(Gb)/f = 9.39
(3) vd (Len) − vd (Lep) = 32.0
(6) H3/H1 = 0.53
(9) |f(Gc)/f| = 14.4

Figure 10:
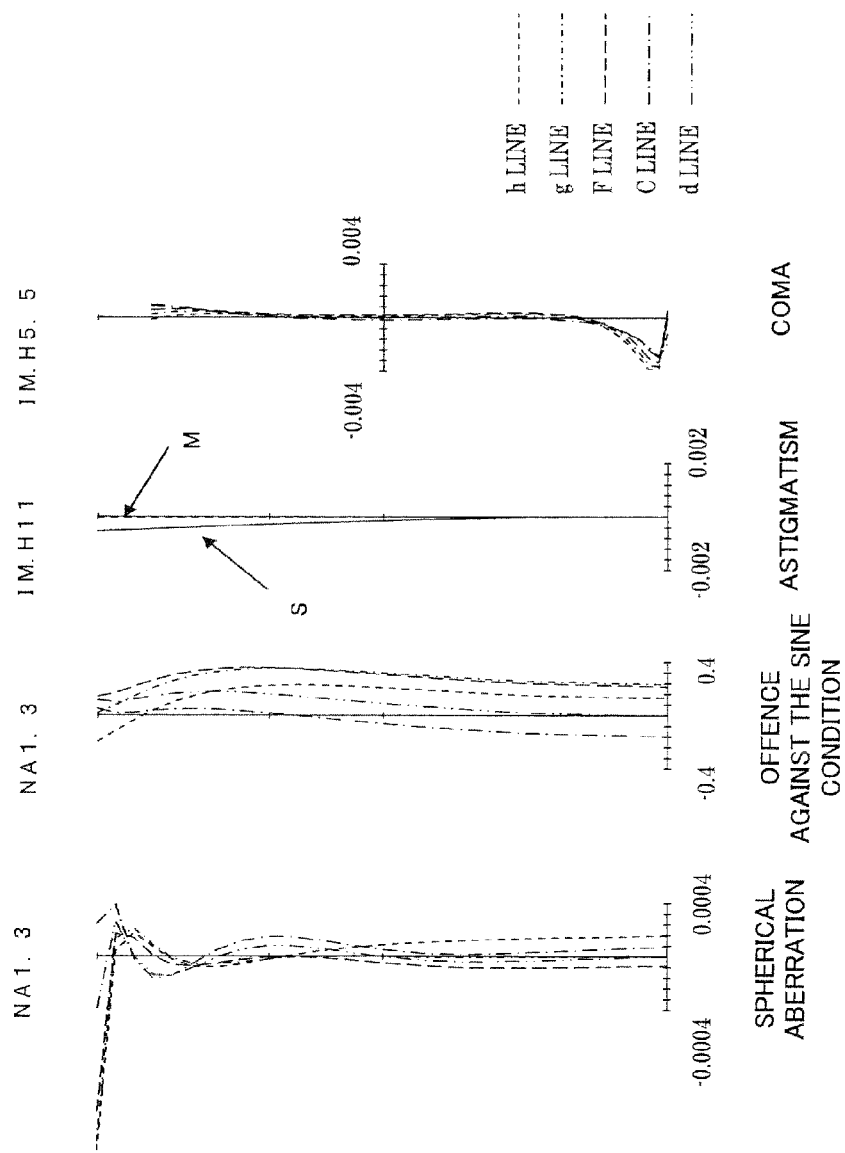
FIG. 10 shows the aberration of the objective according to the embodiment 5.

With the above-mentioned configuration, the aberration correction on the chromatic aberration and various aberrations are corrected in the wavelength range from 405 nm to 656 nm according to the present embodiment. The aberration correction is shown in FIG. 10.

Embodiment 6

Figure 11:
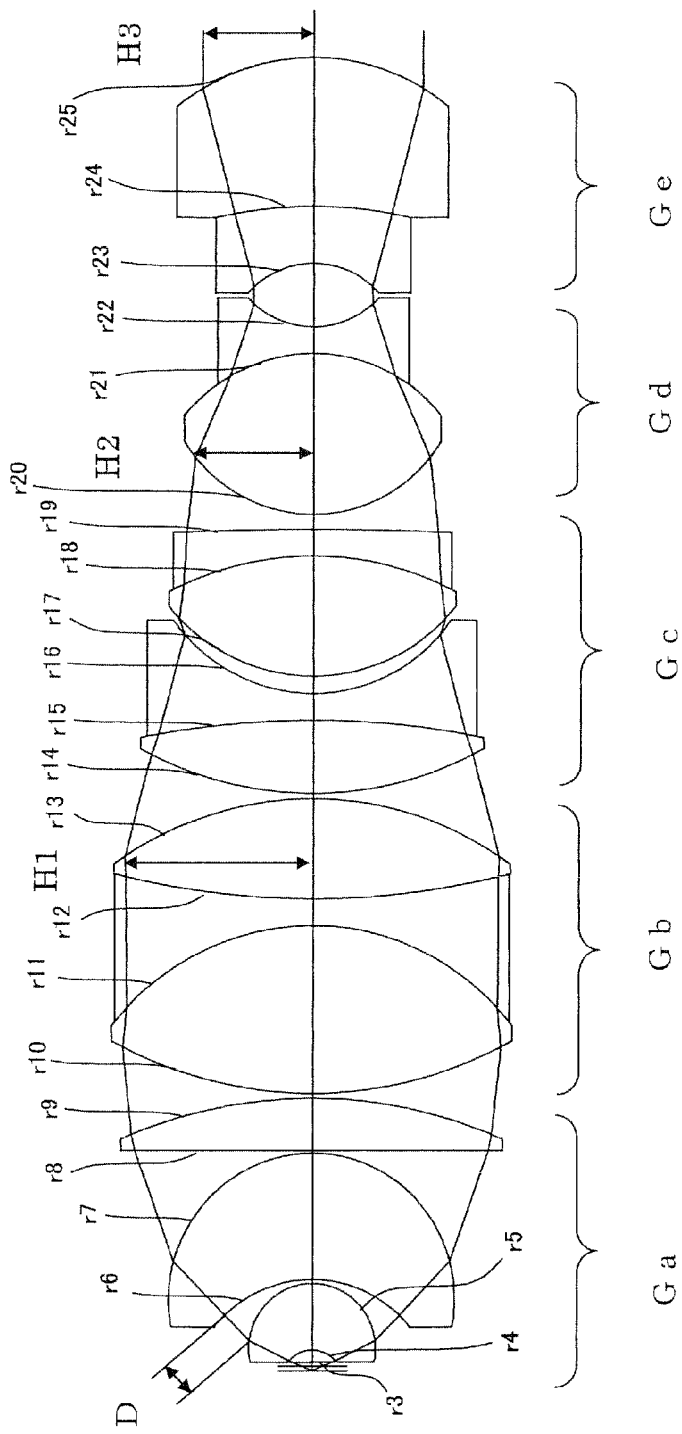
FIG. 11 is a sectional view of the objective according to the embodiment 6.

The embodiment 6 according to the present invention has the configuration shown in FIG. 11. That is, it is configured by, in order from the object side to the image side, a positive lens group Ga, a positive lens group Gb, a lens group Gc, a lens group Gd, and a lens group Ge. The positive lens group Ga includes a cemented lens G1 including a plano-convex lens whose plane surface faces the object side and a meniscus lens whose concave surface faces the object side, a positive meniscus lens G2 whose concave surface faces the object side, and a positive single lens G3. The positive lens group Gb is formed by a 3-cemented lens G4 including a positive lens, a negative lens, and a positive lens. The lens group Gc is formed by a cemented lens G5 including a negative lens and a positive lens, and a cemented lens G6 including a positive lens and a negative lens. The lens group Gd is formed by a cemented lens G7 including a positive lens and a negative lens, and shaped a meniscus lens which has the strongly concave surface that faces the image side. The lens group Ge is formed by a negative lens G8 including a negative lens and a positive lens.

As recognized from FIG. 11, the present embodiment shows the characteristic geometry of the lens group Ga on the object side. Generally, in an immersion type objective having a large NA value, the lens group of this portion shows a geometry close to a hemisphere. However, in the present embodiment, including two hemispherical lenses is one of the characteristics. With this configuration, the amount of aberration occurring in the lens group Ga is reduced. The radius of a curvature of the image side of the cemented lens G1 is smaller than the focal length f, and the radius of a curvature of the image side of the meniscus lens G2 is smaller than two times the focal length f. From these characteristics, the ray height of and after the lens group G3 can be reduced, thereby easily correcting a high order aberration (spherical aberration, comatic aberration), reducing the outer diameter of the entire lens, and improving the workability of the lens.

The data according to the embodiment 1 is listed below. The objective according to the embodiment 1 is used with the immersing solution of nd=1.51483, vd=41.0. The immersing solution is conventional oil for a microscope objective.

TABLE 6

| surface | r | d | nd | vd | Medium |
|---|---|---|---|---|---|
| 1 | INF | 0.1700 | 1.52426 | 54.3 | COVER GLASS |
| 2 | INF | 0.1600 | 1.51483 | 41.0 | OIL 1 |
| 3 | INF | 0.4500 | 1.51630 | 64.2 | GLASS 1 |
| 4 | −1.1911 | 2.4899 | 1.88298 | 40.8 | GLASS 2 |
| 5 | −2.4236 | 0.1500 | | | |
| 6 | −4.8347 | 4.7312 | 1.58909 | 61.1 | GLASS 3 |
| 7 | −5.4383 | 0.0996 | | | |
| 8 | INF | 1.9585 | 1.56879 | 71.4 | GLASS 4 |
| 9 | −17.9821 | 0.1819 | | | |
| 10 | 15.6845 | 6.3021 | 1.49692 | 81.5 | GLASS 5 |
| 11 | −9.5805 | 1.0000 | 1.63797 | 42.4 | GLASS 6 |
| 12 | 30.7512 | 3.7597 | 1.43873 | 95.2 | GLASS 7 |
| 13 | −12.7994 | 0.2000 | | | |
| 14 | 13.5205 | 2.7514 | 1.43873 | 95.2 | GLASS 7 |
| 15 | −33.2401 | 1.0000 | 1.63797 | 42.4 | GLASS 6 |
| 16 | 6.4397 | 0.6500 | | | |
| 17 | 7.0014 | 4.5120 | 1.43873 | 95.2 | GLASS 7 |
| 18 | −11.7519 | 1.0000 | 1.63797 | 42.4 | GLASS 6 |
| 19 | −111.2141 | 0.5564 | | | |
| 20 | 5.7331 | 6.0366 | 1.49692 | 81.5 | GLASS 5 |
| 21 | −6.3221 | 1.0000 | 1.61336 | 44.5 | GLASS 12 |
| 22 | 3.4357 | 2.3800 | | | |
| 23 | −3.3602 | 2.1379 | 1.51630 | 64.2 | GLASS 1 |
| 24 | −16.5008 | 5.5869 | 1.80000 | 29.8 | GLASS 14 |
| 25 | −8.1656 | | | | |

β = 60x, NA = 1.4, field number = 22, WD = 0.16, f = 3
f(Ga) = 4.835
f(Gb) = 24.100
f(Gc) = −66.770
f(Gd) = −30.153
f(Ge) = −436.809
f(Ga) = 1.61
f(Gb) = 8.03
f(Gc) = −22.26
f(Gd) = −10.05
f(Ge) = −145.60
f(G1 + G2) = 5.740
H1 = 7.12
H2 = 4.47
H3 = 4.2
D = 1.33

TABLE 6-continued vd (Len) = 64.2
vd (Lep) = 29.8
nd (Len) = 1.51630
nd (Lep) = 1.80000
(1) H2/H1 = 0.63
(2) f(Gb)/f = 8.03
(3) vd (Len) − vd (Lep) = 34.4
(6) H3/H1 = 0.59
(7) f(G1 + G2)/f = 1.91
(8) D/f = 0.44

Figure 12:
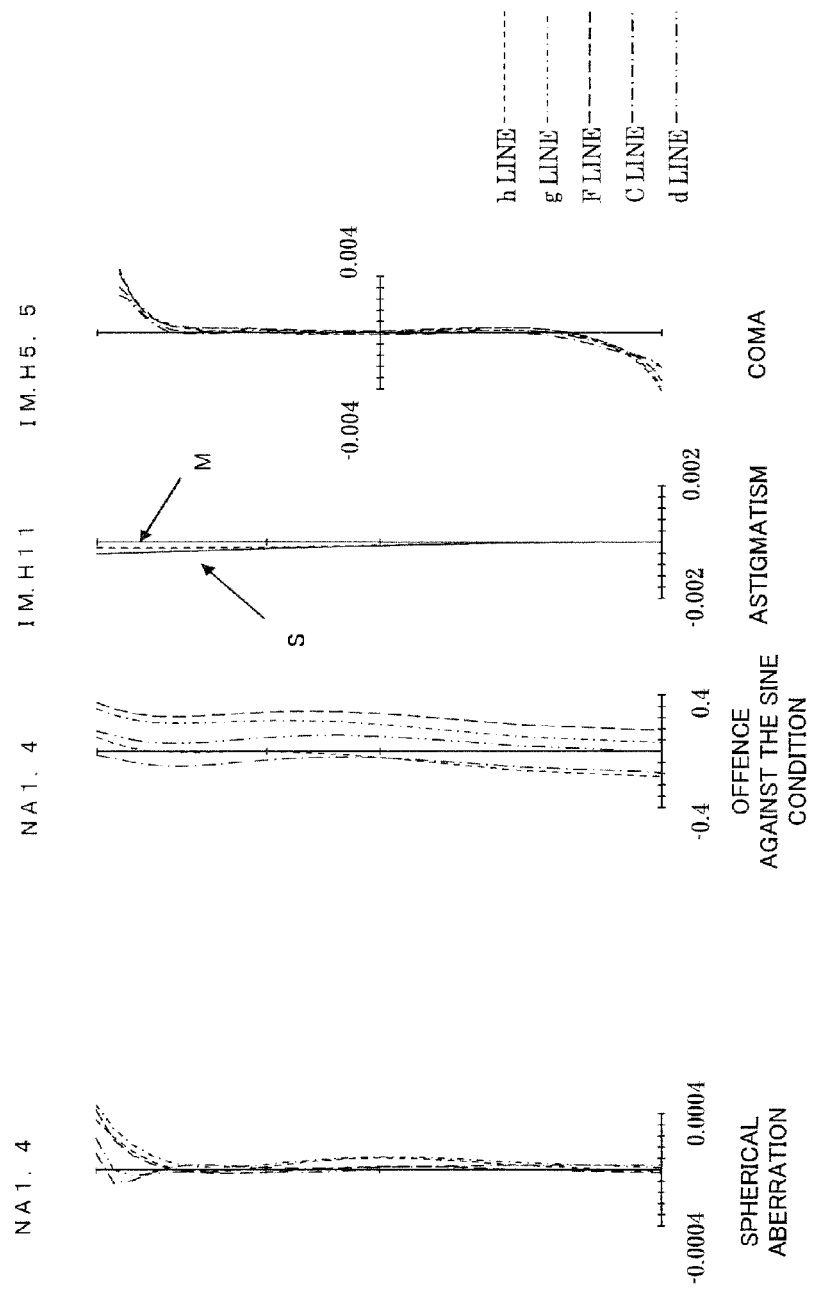
FIG. 12 shows the aberration of the objective according to the embodiment 6.

With the above-mentioned configuration, the aberration correction on the chromatic aberration and various aberrations are corrected in the wavelength range from 405 nm to 656 nm according to the present embodiment. The aberration correction is shown in FIG. 12.

Embodiment 7

Figure 13:
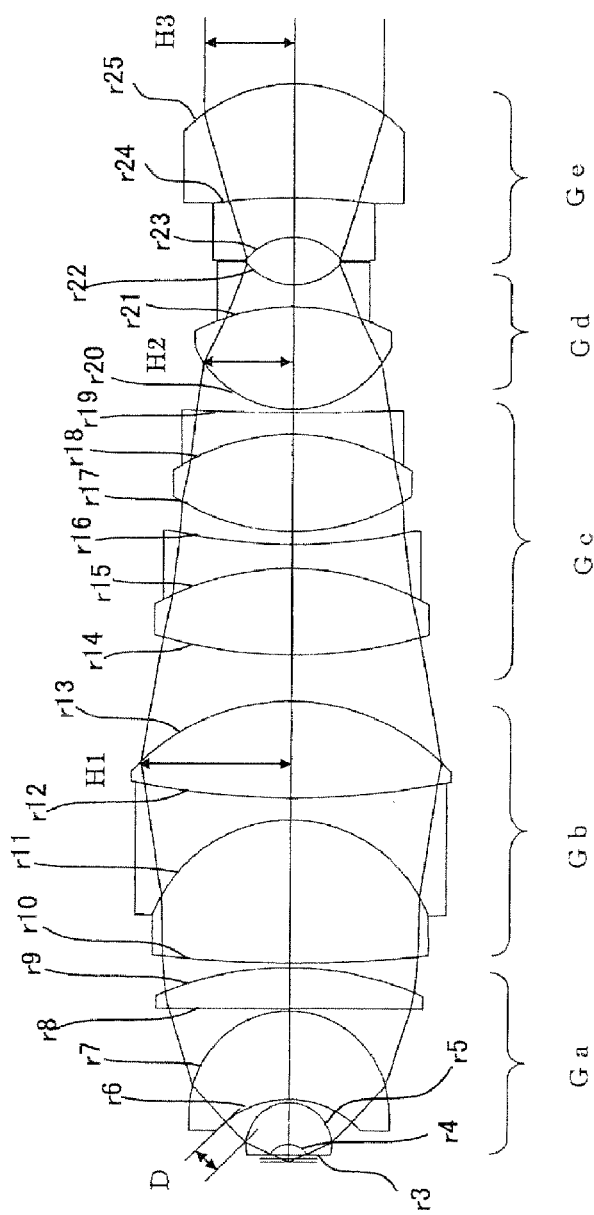
FIG. 13 is a sectional view of the objective according to the embodiment 7.

The embodiment 7 according to the present invention has the configuration shown in FIG. 13. That is, it is configured by, in order from the object side to the image side, a positive lens group Ga, a positive lens group Gb, a lens group Gc, a lens group Gd, and a lens group Ge. The positive lens group Ga includes a cemented lens G1 including a plano-convex lens whose plane surface faces the object side and a meniscus lens whose concave surface faces the object side, a positive meniscus lens G2 whose concave surface faces the object side, and a positive single lens G3. The positive lens group Gb is formed by a 3-cemented lens G4 including a positive lens, a negative lens, and a positive lens. The lens group Gc is formed by a cemented lens G5 including a negative lens and a positive lens, and a cemented lens G6 including a positive lens and a negative lens. The lens group Gd is formed by a cemented lens G7 including a positive lens and a negative lens, and shaped a meniscus lens which has the strongly concave surface that faces the image side. The lens group Ge is formed by a negative lens GB including a negative lens and a positive lens.

As recognized from FIG. 13, the present embodiment shows the characteristic geometry of the lens group Ga on the object side. In the present embodiment, including two hemispherical lenses in the lens group Ga is one of the characteristics. With this configuration, the amount of aberration occurring in the lens group Ga is reduced. The radius of a curvature of the image side of the cemented lens G1 is smaller than the focal length f, and the radius of a curvature of the image side of the meniscus lens G2 is smaller than two times the focal length f. From these characteristics, the ray height of and after the lens group G3 can be reduced, thereby easily correcting a high order aberration (spherical aberration, comatic aberration), reducing the outer diameter of the entire lens, and improving the workability of the lens.

The lens data according to the embodiment 7 is listed below. The objective according to the embodiment 7 is used with the immersing solution of nd=1.51483, vd=41.0. The immersing solution is conventional oil for a microscope objective.

TABLE 7

| surface | r | d | nd | vd | Medium |
|---|---|---|---|---|---|
| 1 | INF | 0.1700 | 1.52426 | 54.3 | COVER GLASS |
| 2 | INF | 0.1600 | 1.51483 | 41.0 | OIL 1 |
| 3 | INF | 0.4800 | 1.51630 | 64.2 | GLASS 1 |

TABLE 7-continued

| | | | | | |
|---|---|---|---|---|---|
| 4 | −1.0707 | 1.9082 | 1.88298 | 40.8 | GLASS 2 |
| 5 | −2.0150 | 0.1500 | | | |
| 6 | −4.6997 | 4.0482 | 1.58909 | 61.1 | GLASS 3 |
| 7 | −4.6584 | 0.1000 | | | |
| 8 | INF | 1.8853 | 1.56879 | 71.4 | GLASS 4 |
| 9 | −15.6297 | 0.2000 | | | |
| 10 | 57.7398 | 6.5664 | 1.49692 | 81.5 | GLASS 5 |
| 11 | −6.9187 | 1.0000 | 1.63797 | 42.4 | GLASS 6 |
| 12 | 36.0738 | 4.4423 | 1.49692 | 81.5 | GLASS 5 |
| 13 | −10.2050 | 2.1217 | | | |
| 14 | 22.5473 | 3.9658 | 1.43873 | 95.2 | GLASS 7 |
| 15 | −13.2349 | 1.0990 | 1.63797 | 42.4 | GLASS 6 |
| 16 | 25.6089 | 0.5967 | | | |
| 17 | 10.3306 | 4.4472 | 1.43873 | 95.2 | GLASS 7 |
| 18 | −10.1548 | 1.0000 | 1.63797 | 42.4 | GLASS 6 |
| 19 | 122.4166 | 0.1440 | | | |
| 20 | 5.0977 | 4.7091 | 1.49692 | 81.5 | GLASS 5 |
| 21 | −9.8163 | 1.0000 | 1.63797 | 42.4 | GLASS 6 |
| 22 | 2.9264 | 2.1844 | | | |
| 23 | −2.9053 | 1.7874 | 1.48745 | 70.3 | GLASS 8 |
| 24 | −30.6009 | 5.2239 | 1.73800 | 32.2 | GLASS 9 |
| 25 | −7.1509 | | | | |

$\beta$ = 60x, NA = 1.4, field number = 22, WD = 0.16, f = 3
f(Ga) = 3.973
f(Gb) = 28.967
f(Gc) = 3756.617
f(Gd) = −19.235
f(Ge) = 671.695
f(Ga) = 1.32
f(Gb) = 9.66
f(Gc) = 1252.21
f(Gd) = −6.41
f(Ge) = 223.90
f(G1 + G2) = 4.5
H1 = 7.01
H2 = 4.16
H3 = 4.2
D = 1.3
vd (Len) = 70.3
vd (Lep) = 32.2
nd (Len) = 1.48745
nd (Lep) = 1.73800
(1) H2/H1 = 0.59
(2) f(Gb)/f = 9.66
(3) vd (Len) − vd (Lep) = 38.1
(6) H3/H1 = 0.60
(7) f(G1 + G2)/f = 1.50
(8) D/f = 0.43

Figure 14:
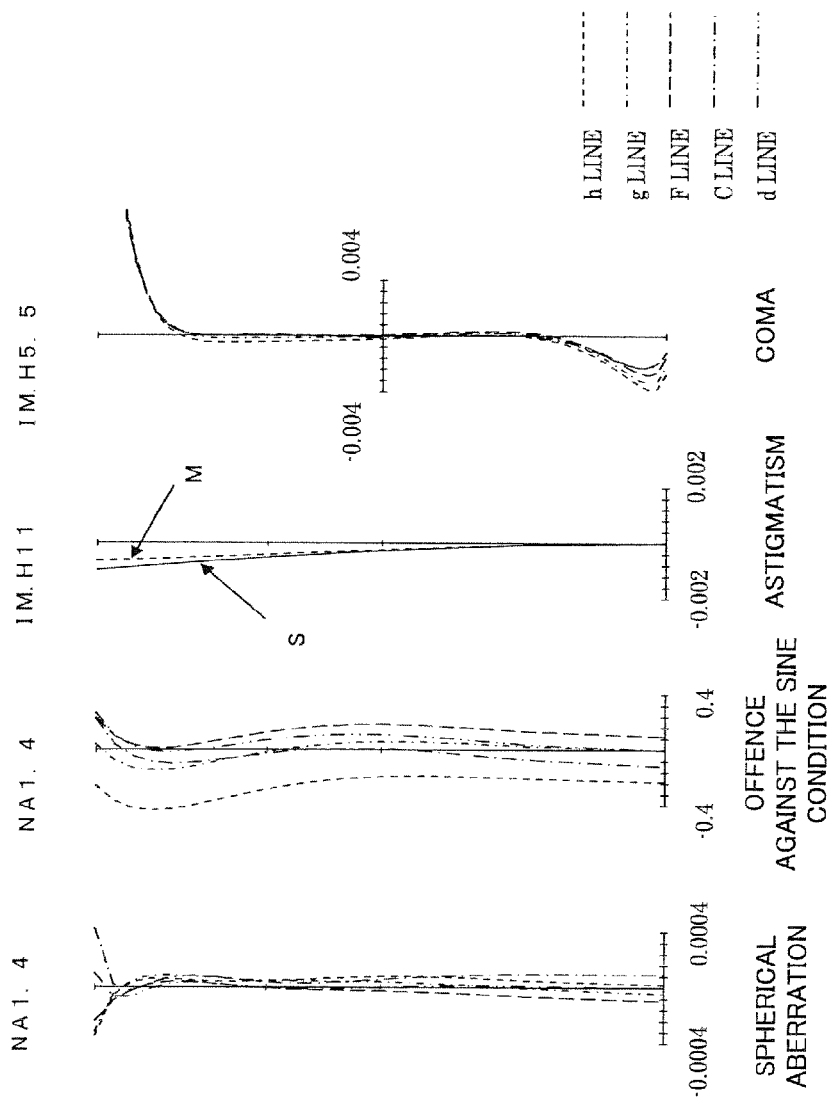
FIG. 14 shows the aberration of the objective according to the embodiment 7.

With the above-mentioned configuration, the aberration correction on the chromatic aberration and various aberrations are corrected in the wavelength range from 405 nm to 656 nm according to the present embodiment. The process of the correction is shown in FIG. 14.

Figure 15:
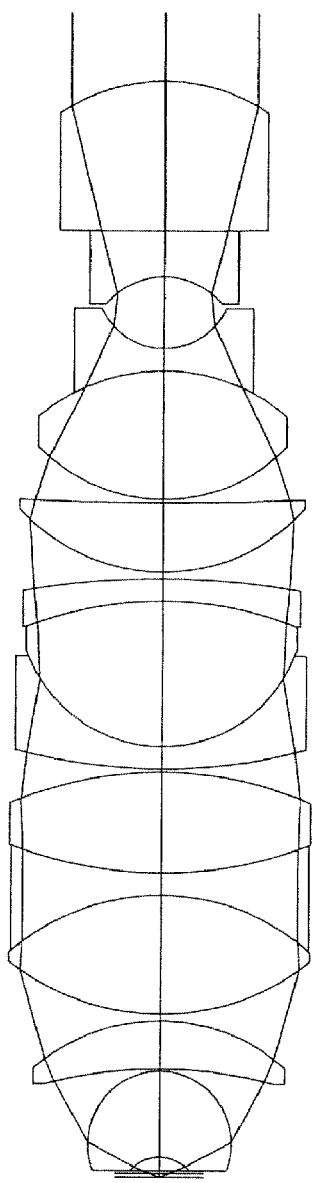
FIG. 15 is a sectional view of the objective according to the comparison example 1.
Figure 16:
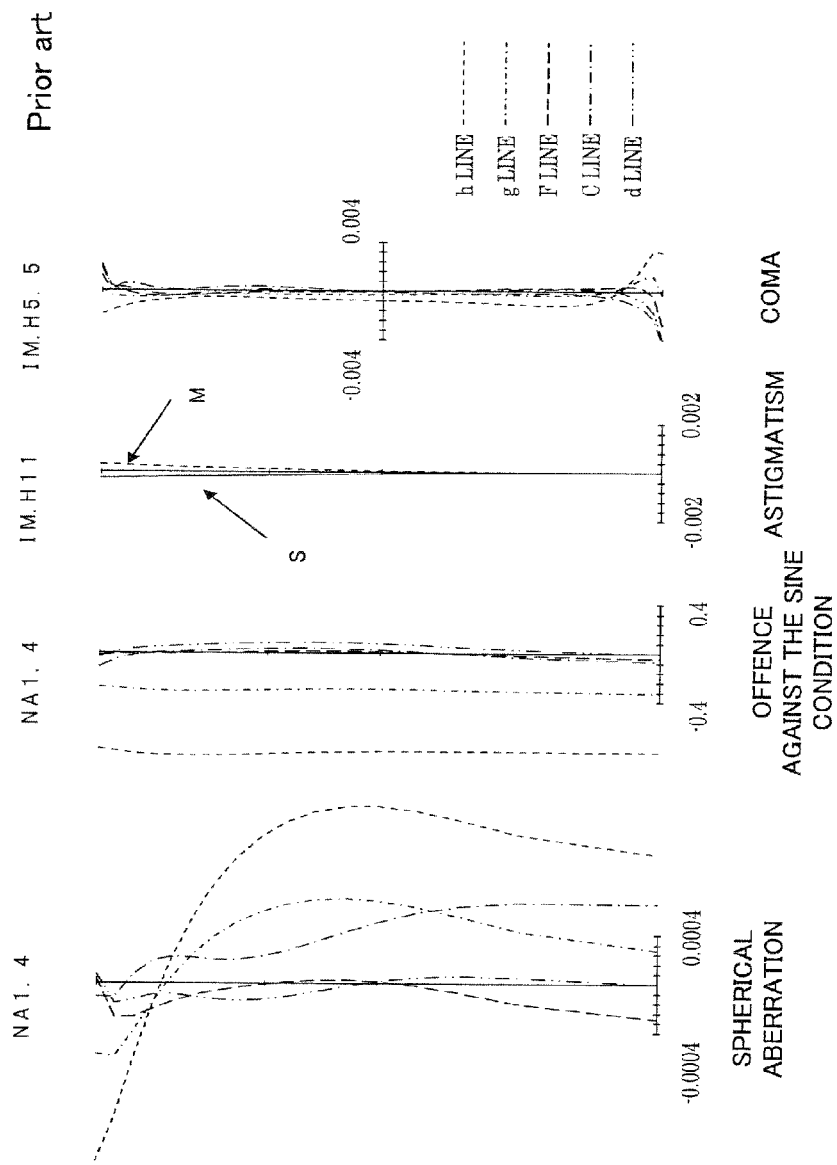
FIG. 16 shows the aberration of the objective according to the comparison example 1.
Figure 17:
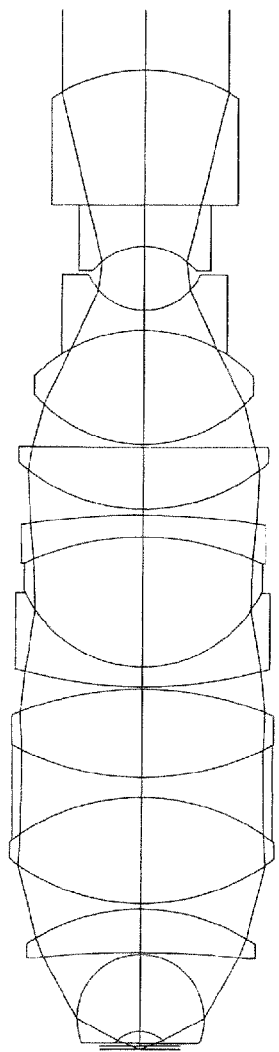
FIG. 17 is a sectional view of the objective according to the comparison example 2.
Figure 18:
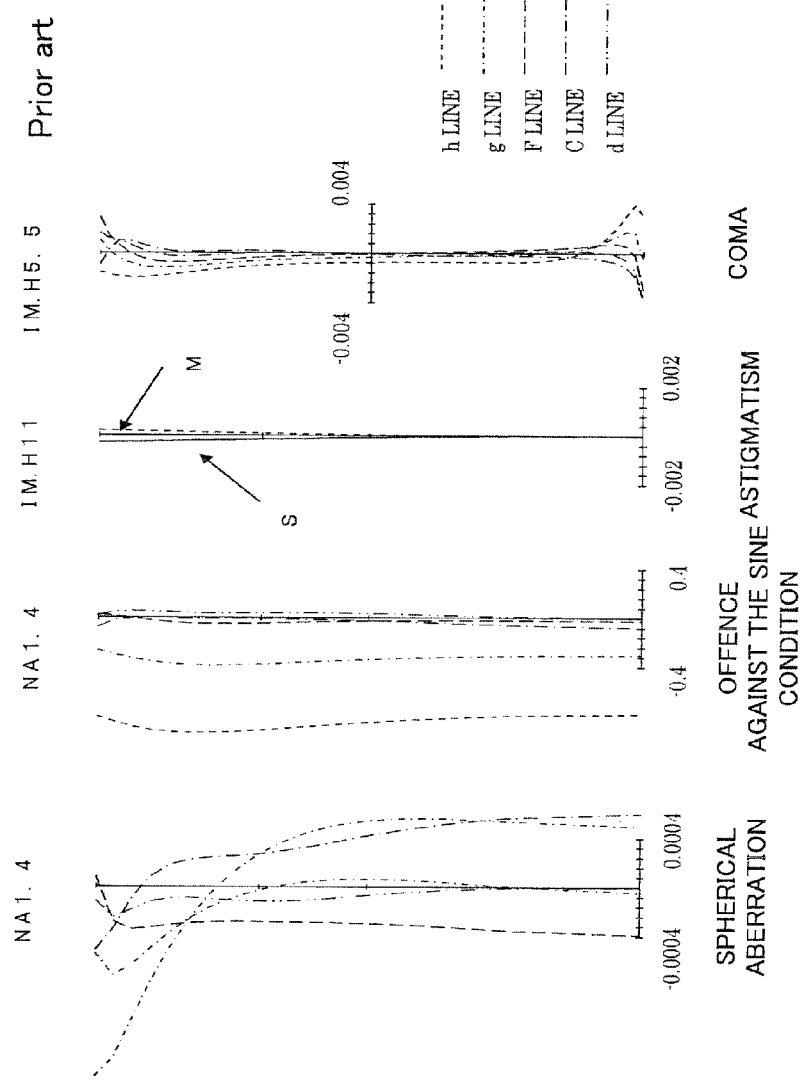
FIG. 18 shows the aberration of the objective according to the comparison example 2.
Figure 19:
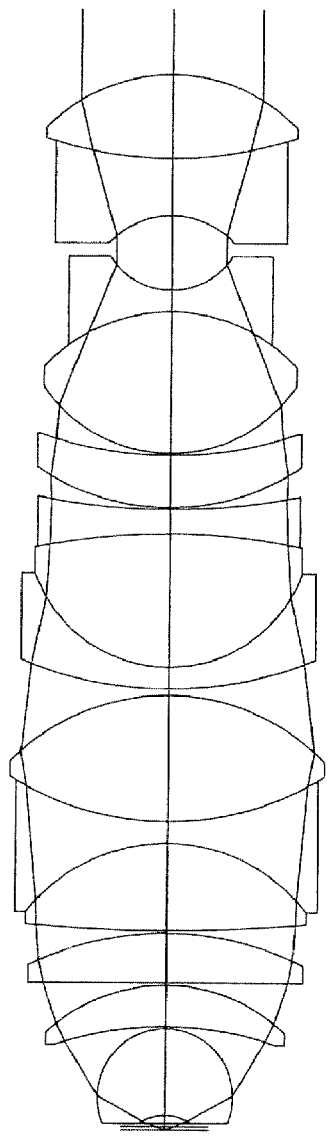
FIG. 19 is a sectional view of the objective according to the comparison example 3.
Figure 20:
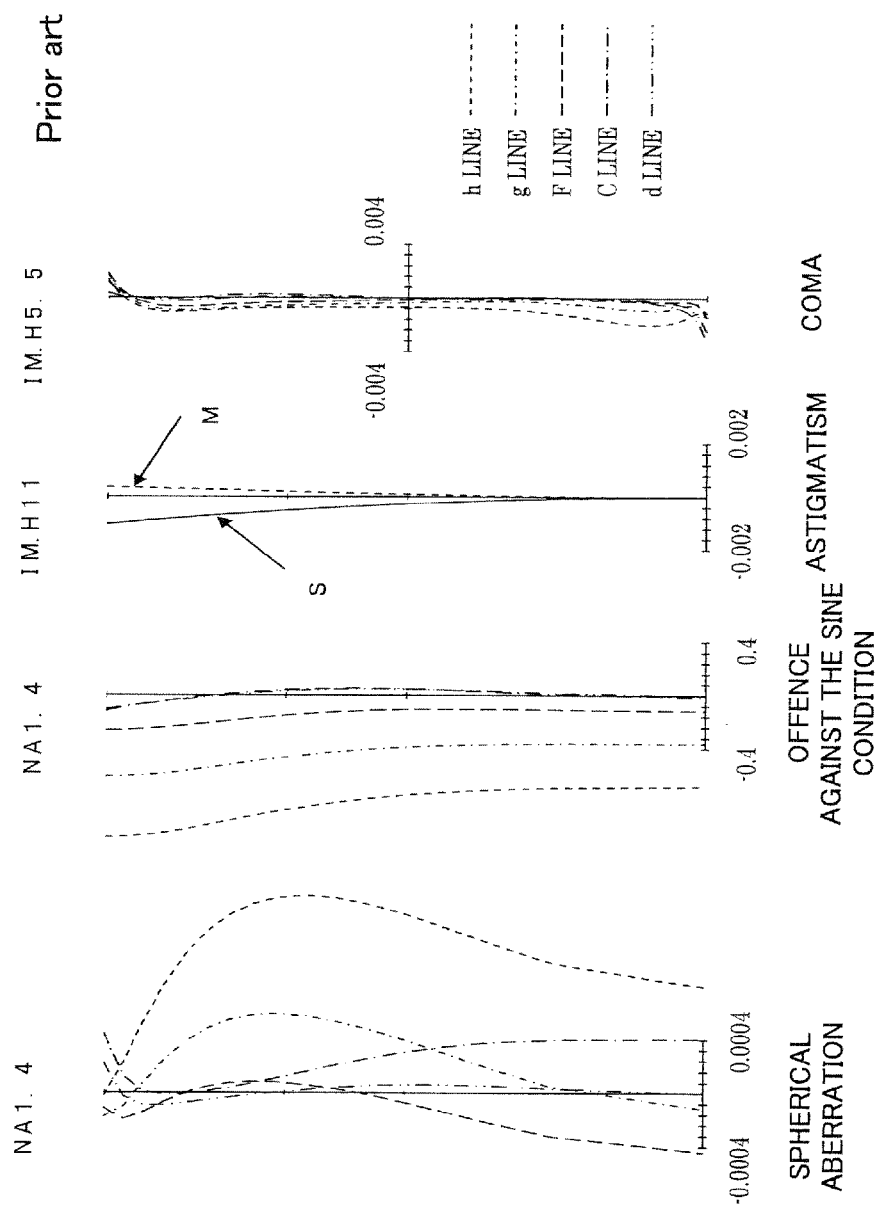
FIG. 20 shows the aberration of the objective according to the comparison example 3.
Figure 23:
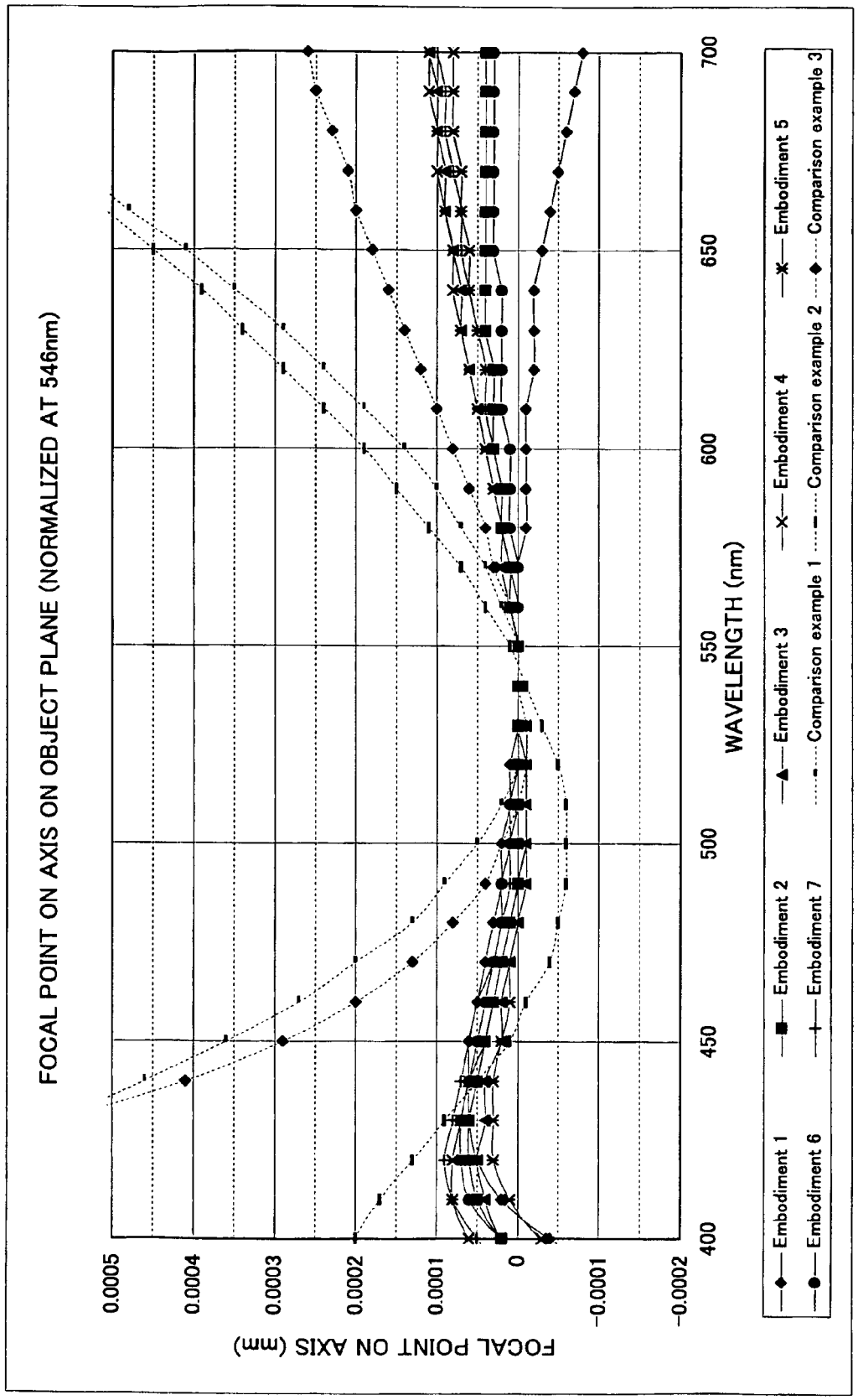
FIG. 23 shows the focal point on the axis at each wavelength in the object side according to each embodiment.

FIG. 23 shows the axial chromatic aberration from 400 nm to 700 nm according to the embodiments 1 through 7. For comparison with the prior art, the objectives disclosed in the Japanese Published Patent Application No. H7-35983 and the Japanese Published Patent Application No. 2003-21786 are also described. The comparison example 1 shown in FIG. 23 is the objective disclosed in the embodiment 1 in the Japanese Published Patent Application No. H7-35983, and the comparison example 2 shown in FIG. 23 is the objective disclosed in the embodiment 2 of the Japanese Published Patent Application No. H7-35983. The comparison example 3 is the objective disclosed in the embodiment 4 of the Japanese Published Patent Application No. 2003-21786. The sectional view of the lens in the comparison example 1 is shown in FIG. 15, and FIG. 16 shows the aberration. FIG. 17 shows the sectional view of the lens of the comparison example 2, and FIG. 18 shows the aberration. FIG. 19 shows the sectional view of the lens of the comparison example 3. FIG. 20 shows the aberration.

FIG. 23 shows the focal point on the axis on the object plane at each wavelength normalized on the e-line (546.07 nm). The horizontal axis indicates the wavelength (nm), and the vertical axis indicates the gap of the focal point at each wavelength when the e-line (546.07 nm) is defined as the zero.

As shown in FIG. 23, the axial chromatic aberration of the objective according to the embodiments of the present invention is appropriately corrected so that the gap of the focal point at each wavelength is within 0.1 μm (0.0001 mm) in 400 nm through 700 nm. This means the objective according to an embodiment of the present invention effectively works on a multi-wavelength observation.

Figure 24B:
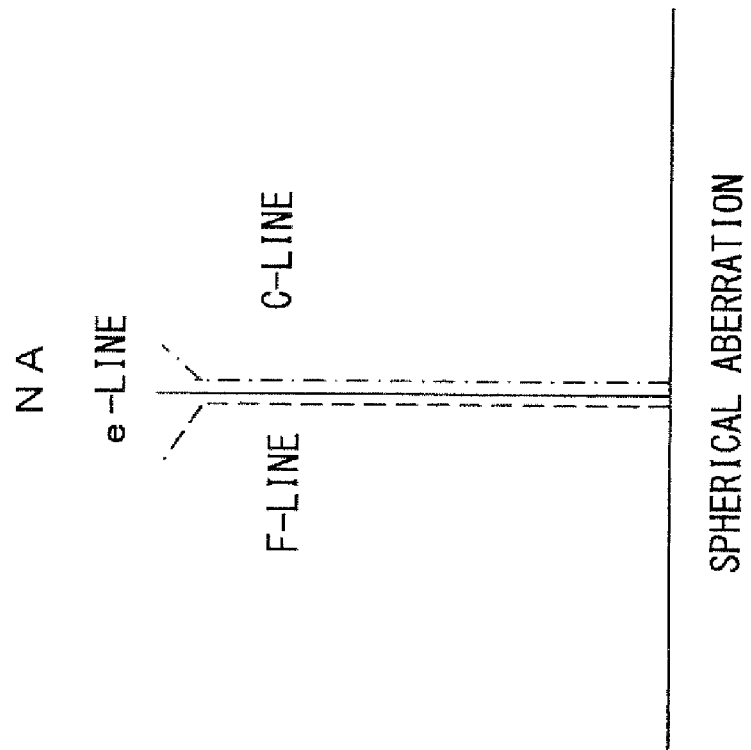
FIG. 24B shows the outline of the view of the aberration of the axial chromatic aberration of the objective in embodiments of the present invention.
Figure 24A:
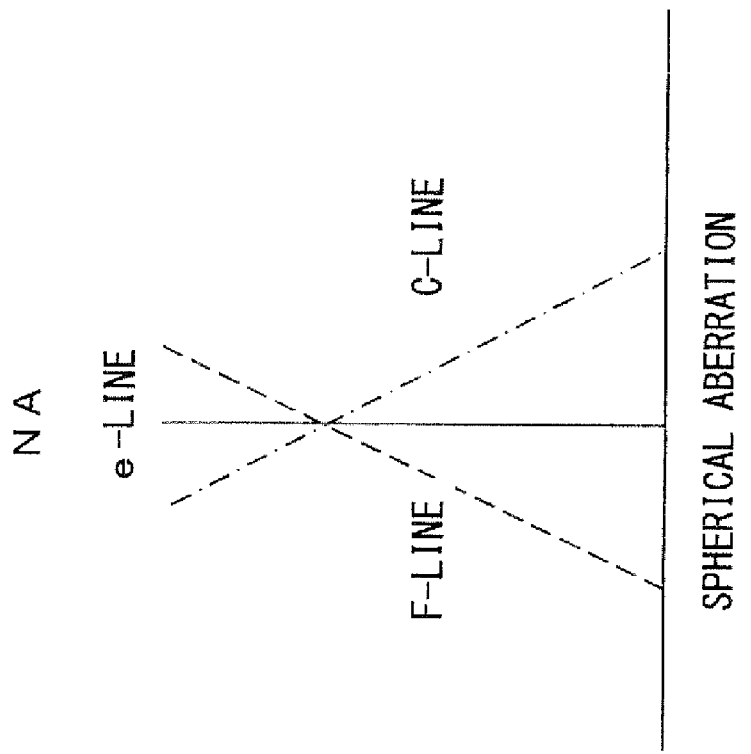
FIG. 24A shows the outline of the view of the aberration of the axial chromatic aberration of the objective in conventional art.

In addition, as clearly shown in comparing the aberration (FIGS. 2, 4, 6, 8, 10, 12, and 14) according to each embodiment with the aberration (FIGS. 16, 18, and 20) of each comparison example, the embodiments of the present invention have characteristics in the method of correcting the spherical aberration. As shown in FIG. 24B, the objective according to the present embodiment corrects the spherical aberration equally on all NA at each wavelength. On the other hand, in the comparison example as the prior art, as shown in FIG. 24A, there are positive and negative portions of the spherical aberration with respect to the NA, which offsets the focal points for the respective wavelengths, thereby substantially equally correcting the focal point for each wavelength.

When the aberration correction as in the above-mentioned prior art is performed, there occurs a serious effect when the NA of the objective is used with bias. For example, the effect clearly comes out when the NA of the objective is narrowed and the laser beam having a Gaussian distribution is input to the objective.

Figure 25:
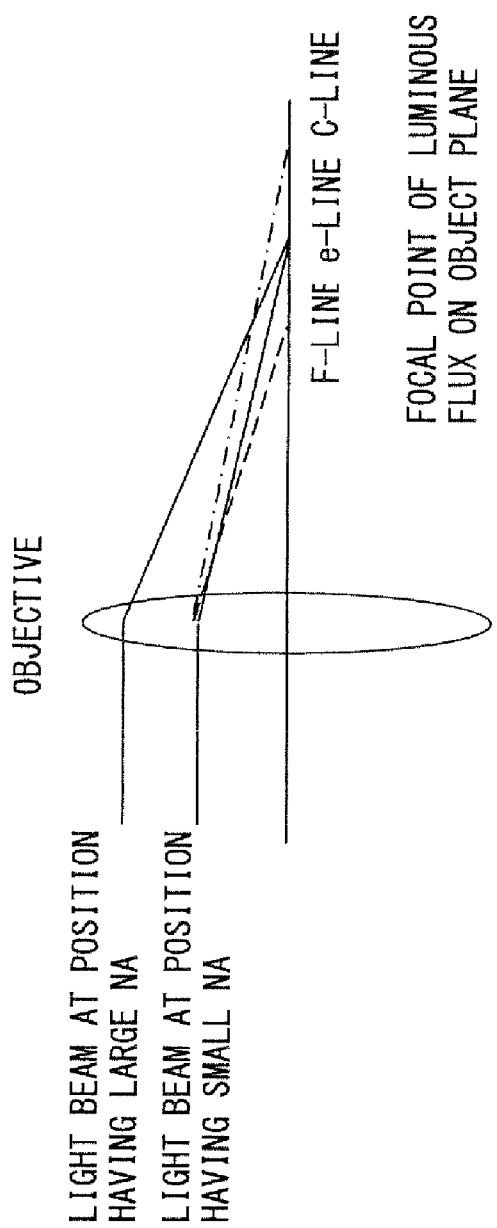
FIG. 25 shows the outline of the difference in the focal point of each wavelength depending on the difference in level of the illumination luminous flux.

FIG. 25 is an explanatory view of the event. As shown in FIG. 25, with a common and conventional objective, the chromatic aberration of a ray from the position of a larger NA is corrected such that the ray can form an image at substantially the same position regardless of the wavelength, but a ray at the position of a smaller NA forms an image at a different position for each wavelength. The direct cause of the event is the method of correcting the spherical aberration as shown in FIG. 24A.

On the other hand, with the objective according to an embodiment of the present invention, as shown in FIG. 24B, since the spherical aberration is equally corrected over the entire NA for each wavelength, there occurs little influence although the NA of the objective is used with bias. That is, the objective according to the present invention is highly appropriate for the laser scanning microscope used by a Gaussian beam incident to the objective.

FIG. 23 shows the chromatic aberration of magnification of the embodiments 1 through 7 and comparison example, which is the chromatic aberration of magnification at field number 9 normalized at the wavelength 488 nm. The horizontal axis indicates the wavelength (nm), and the vertical axis indicates the gap of the focal point at each wavelength. The field number 9 corresponds to 0.075 mm in the objective plane since the objectives magnifies object 60 times.

Figure 26:
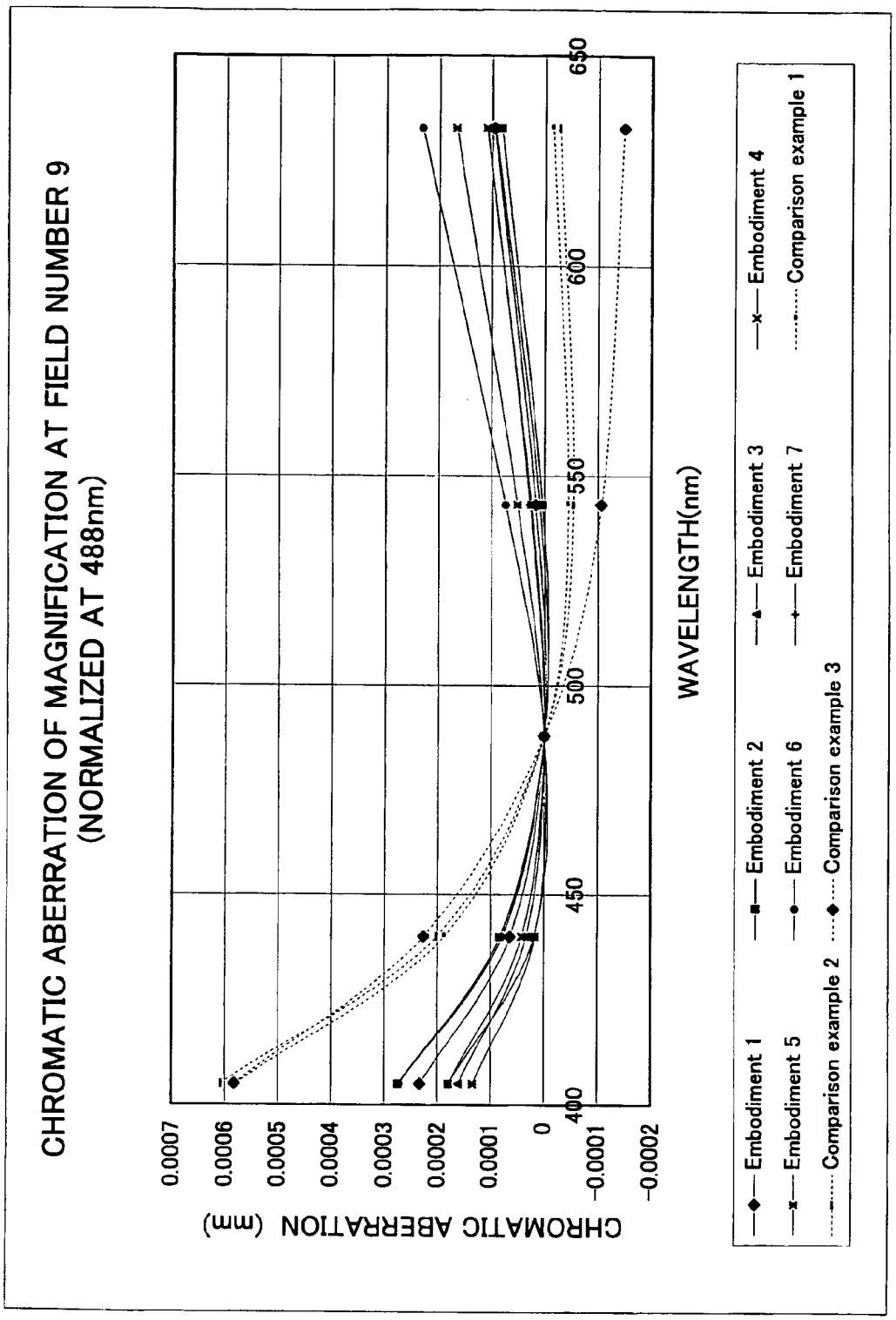
FIG. 26 shows the chromatic aberration of magnification at field number 9 on each wavelength according to each embodiment.

As shown in FIG. 26, the chromatic aberration of magnification of the objective according to the embodiments of the present invention is appropriately corrected so that the gap of the focal point at each wavelength is within 0.3 μm (0.0003 mm). Described below are the embodiments of the present invention from the point of the fluorescent observation apparatus.

The fluorescent observation apparatus as one of the embodiments of the present invention includes: a light source; a beam splitting device selectively reflecting a ray from the light source; an objective for illuminating or observing a specimen; a stage for fixing a specimen; a wavelength selection device for selecting a desired wavelength range based on rays that pass through the beam splitting device; and a detector for detecting a ray that passes through the wavelength selection device. With the configuration, assume that $\lambda 1$ is the longest wavelength and $\lambda 2$ is the shortest wavelength in illuminating the specimen using two or more wavelengths, and $\Delta 1$ and $\Delta 2$ are the focal point of $\lambda 1$ and $\lambda 2$ respectively on the optical axis of the objective. Based on the assumption, the following conditions are satisfied.

$$\lambda 1 - \lambda 2 \geq 180 \text{ nm} \quad (11)$$

$$|\Delta 1 - \Delta 2| < 0.2 \text{ μm} \quad (12)$$

If the expressions (11) and (12) can be satisfied, then the chromatic aberration can be ignored although the specimen is dyed with a plurality of fluorescent tags.

It is furthermore desired to satisfy the following conditional expression.

$$\lambda 2 \leq 442 \text{ nm} \quad (13)$$

Recently used is a photoactivation fluorescent tag whose characteristic is changed by a stimulating ray on the shorter wavelength side. For example, with photoconvertion fluorescent protein such as Kaede, PA-GFP, etc., a wavelength of 405 nm is commonly used. In addition, since 442 nm is used in the observation of fluorescent resonant energy transfer (FRET) of CFP-YFP, the observations of the photoactivation and fluorescent resonant energy transfer (FRET) can be performed if the expression (13) is satisfied.

It is furthermore desired to satisfy the following condition.

$$|\delta 1 - \delta 2| \leq 0.3 \text{ μm} \quad (14)$$

where $\delta 1$ and $\delta 2$ indicate the chromatic aberration of the magnification of each wavelength at the field number 9 of $\lambda 1$ and $\lambda 2$ respectively.

At this time, the objective is configured by, in order from the object side to the image side, a positive lens group Ga, a positive lens group Gb, a lens group Gc, a lens group Gd, and a lens group Ge. The positive lens group Ga includes a cemented lens obtained by cementing a plano-convex lens whose plane surface faces the object side to a meniscus lens whose concave surface faces the object side, and a positive single lens. The positive lens group Gb is formed by a cemented lens. The lens group Gc includes one or more cemented lens. The lens group Gd includes a meniscus lens having a strongly concave surface that faces the image side. The lens group Ge includes a negative lens having a strongly concave surface that faces the object side. It can be considered that the lens group Gb is a cemented triplet including a positive lens, a negative lens, and a positive lens. Using the objective with the configuration is suitable for the fluorescent observation.

Furthermore, it is desired that the objective satisfies the following conditions.

$$0.5 \leq H2/H1 \leq 0.75 \quad (1)$$

$$7.8 \leq f(Gb)/f \leq 20 \quad (2)$$

In addition, it is desired that the objective compensate the chromatic aberration by itself. In this case, the flexibility of selecting the units to be combined (image optics system, illumination optics system) is enhanced.

The fluorescent observation apparatus as one of the embodiments of the present invention includes: an image storage device for storing at least two images formed from a detection result by the detector when the specimen is illuminated using the excitation wavelengths $\lambda 1$ and $\lambda 2$; and an image analysis device for calculating the overlap, the difference, or the ratio of the images. With the configuration, it is appropriate to calculate the overlap, the difference, or the ratio of a plurality of images.

the apparatus also includes an image storage device for storing an image excited by the excitation wavelengths $\lambda 1$ and $\lambda 2$, and an image analysis device for calculating the overlap, the difference, or the ratio of the images. With the configuration, it is easy to analyze the molecules in the specimen dyed with a fluorescent tag by calculating the overlap, the difference, or the ratio of a plurality of images. Recently, multiple data of a plurality of fluorescent wavelengths is obtained, for example, the FRET for analysis of molecules. In this case, a chromatic aberration corrected microscope objective is appropriate.

Furthermore, with the fluorescent observation apparatus as one of the embodiments of the present invention, the stage or the objective can be moved in the direction of the optical axis. At least two images formed as the detection result by the detector when the specimen is illuminated with the different excitation wavelengths $\lambda 1$ and $\lambda 2$. The above procedure is repeated while the intervals of the specimen and the objective are changed step by step, and the sectional images of the specimen with the different excitation wavelengths $\lambda 1$ and $\lambda 2$. Finally, multicolored three dimensional image of the specimen is formed, overlapping the three dimensional images with wavelengths $\lambda 1$ and $\lambda 2$.

The present chromatic aberration corrected system is specifically effective in generating a three-dimensional image of a specimen. If there is axial chromatic aberration, the focal point in the direction of the optical axis with $\lambda 1$ and $\lambda 2$ is shifted in the direction of the optical axis. Therefore, when the images of $\lambda 1$ and $\lambda 2$ are overlapped, it has conventionally been necessary to overlap the images having different sectional positions in the axial chromatic aberration of the objective. In the present system, the axial chromatic aberration is so small that the axial chromatic aberration can be ignored. As a result, a correct three dimensional image can be generated.

The fluorescent observation apparatus as one of the embodiments of the present invention include: a scanning device scanning a beam spot on the focal plane; and a confocal detection device projecting the beam spot.

The fluorescent observation apparatus as one of the embodiments of the present invention is appropriate for observation on the three dimensional image of the specimen since the axial chromatic aberration is corrected.

The fluorescent observation apparatus as one of the embodiments of the present invention include: a plurality of laser light sources are provided to combine lasers of plural wavelengths on the same optical path, and lead the combined lasers into the fluorescent observation apparatus by one optical fiber.

When laser lights are led into a microscope, it is usual to employ fiber optics which has high flexibility. In conventional art, different optical fiber are used in case that the desired lasers have difference in the wavelength. In this configuration, adjusting the subsequently arranged collimating lenses can correct the chromatic aberration, but it is hard to adjust the collimating lenses for each. On the other hand, since the fluorescent observation apparatus as one of the embodiments of the present invention is corrected in the chromatic aberration, this fluorescent observation apparatus can employ a broadband optical Fiber, which is developed recently.

The fluorescent observation apparatus as one of the embodiments of the present invention is appropriate for observing a specimen indicated by a plurality of fluorescent tags, the position information about the molecules in the specimen provided with two or more indicators is analyzed by superposing and outputting images obtained by the excitation wavelengths of λ1 and λ2.

In case of observing fluorescent resonant energy transfer or photoconversion, it is necessary to compute the ratio or composite image of the fluorescence of the different wavelength. In this observation, it happens to obtain inaccurate data caused by the chromatic aberration. The fluorescent observation apparatus as one of the embodiments of the present invention is appropriate for observing the information where the molecules are in the specimen.

The fluorescent observation apparatus as one of the embodiments of the present invention is appropriate for obtaining a plurality of images formed from the detection result by the detector when the specimen is illuminated by the excitation wavelengths of λ1 and λ2 are acquired with the lapse of time, and the fluorescent resonant energy transfer between the molecules in the specimen is observed by obtaining a plurality of ratios of images by λ1 and λ2 with the lapse of time when the images are acquired at the same time.

In conventional art, it is often necessary to composite the images of different sections on the optical axis intentionally because of the chromatic aberration. In this technique, the gap between the images of the different wavelength can be compensated when the specimen is stay. However it is necessary to observe the timely accurate data in entire wavelengths in case of observing the molecular migration in a live specimen. The fluorescent observation apparatus as one of the embodiments of the present invention is appropriate for the observations which trace rapid molecular migrations.

The fluorescent observation apparatus as one of the embodiments of the present invention is appropriate for obtaining a specimen image having two or more fluorescent tags is acquired and brightness information about the obtained image is expressed and plotted in a two-dimensional array for each pixel, thereby estimating localization of each molecule.

Colocalization method is to obtain images of a specimen with at least two fluorescent tags and to plot the brightness information of the images and to estimate localization of molecules in the specimen. The fluorescent observation apparatus as one of the embodiments of the present invention is appropriate for this observation.

The fluorescent observation apparatus as one of the embodiments of the present invention is appropriate for outputting an image of specimen formed from a detection result of the detector when a excitation illuminate the specimen, specifying an area of a part of the image of the specimen, photobleaching fluorescence tags in the specified area, recording the time change of the fluorescent image in the specified area or the outside, and detecting the molecular dispersion in the specimen.

Fluorescent recovery after photobleaching (FRAP) is to output an image of specimen formed from a detection result of the detector when a excitation illuminate the specimen, to specify an area of a part of the image of the specimen, to photobleach fluorescence tags in the specified area, to record the time change of the fluorescent image in the specified area or the outside, and to detect the molecular dispersion in the specimen. The fluorescent observation apparatus as one of the embodiments of the present invention is appropriate for this observation, because the chromatic aberration is corrected.

The fluorescent observation apparatus as one of the embodiments of the present invention is appropriate for outputting an image of specimen formed from a detection result of the detector when a excitation illuminate the specimen, specifying an area of a part of the image of the specimen, photoactivating fluorescence tags in the specified area, recording the time change of the fluorescent image in the specified area or the outside, and for analyzing the molecules in the specimen.

The fluorescent observation apparatus as one of the embodiments of the present invention is appropriate for the observation with Kaede or PA-GFP etc., which are photoactivatedby the light of wavelength 405 nm, because the chromatic aberration is corrected in the range between wavelength 405 nm and 653 nm.

The fluorescent observation apparatus as one of the embodiments of the present invention is appropriate for illuminating a specimen with a plurality of fluorescent tags by a plurality of excitement light simultaneously, detecting the fluorescent lights which are separated, for recording the time change of the fluorescent lights, and computing the velocity of the molecules in the specimen.

There are methods called "FCS" and "FCCS", which is to record the time change of fluorescence and calculate the correlation function. When a plurality of fluorescent wavelengths are detected using a plurality of excitation wavelengths it is confirmed that molecules are coupled. In this case, since it is necessary that there is no gap in excitation wavelengths on the condensing spot to a specimen, the fluorescent observation apparatus as one of the embodiments of the present invention is appropriate.

Figure 27:
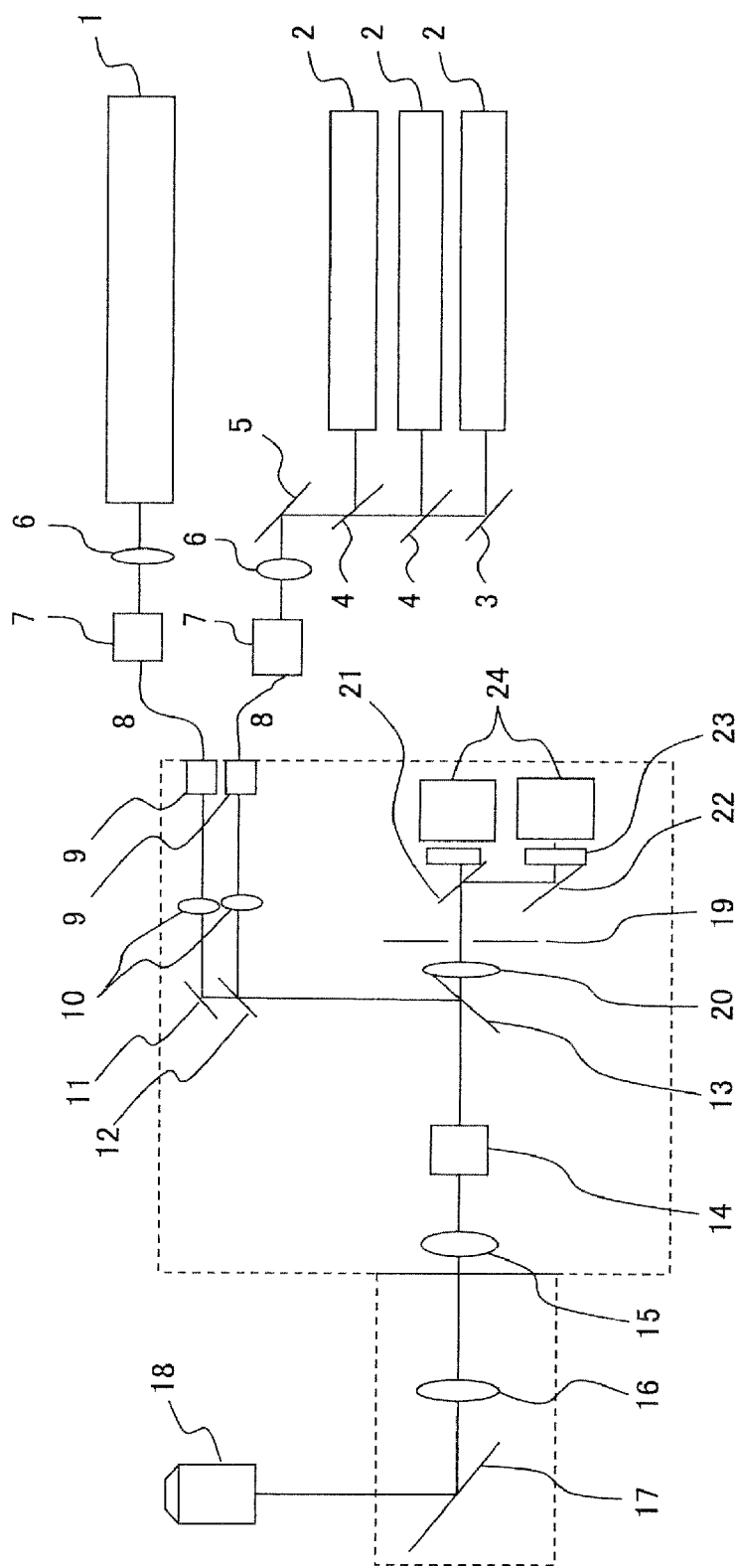
FIG. 27 shows the laser scanning confocal microscope in conventional art.

FIG. 27 shows the configuration of a conventional laser scanning microscope. When, for example, an argon ion laser (wavelength of 488 nm), a He—Ne green laser (wavelength of 543 nm), and a He—Ne laser (wavelength of 633 nm) are used as a visible laser 2, the lasers are combined by a dichroic mirror 4 on the same optical path, and condensed into a single mode fiber 8 by a converging lens 6. Since the single mode fiber has an NA of about 0.1, and the diameter of the core of several μm, a strict adjustment is required to put the laser beams into the fiber. Therefore, a fiber coupling mechanism 7 is provided for adjusting the tilt and the horizontal shift of the laser beams with respect to the fiber.

At this time, when a laser having the wavelength of 405 nm etc. is further used, another fiber is often used as a short wavelength laser 1, introduced to a laser scanning microscope, and combined by a dichroic mirror 12 at a later stage in the conventional technology because the chromatic aberration caused by the objective 18 is adjusted by a collimator lens 10 after the fiber 8. The adjustment is required to use a special method when a laser having the wavelength of 405 nm etc. is used because the wavelength range in which the chromatic aberration is corrected is not sufficient with the conventional objective.

However, since each objective has different chromatic aberrations, it is very difficult to use this adjusting method for all objectives. Since the diameter of an optical fiber is very small and is only several microns, it is necessary to adjust a fiber tilt alignment mechanism 9 for strict parallelism and tilt of the fiber when it is adapted to a microscope. Therefore, the conventional laser scanning microscope requires complicated adjustments.

Figure 28:
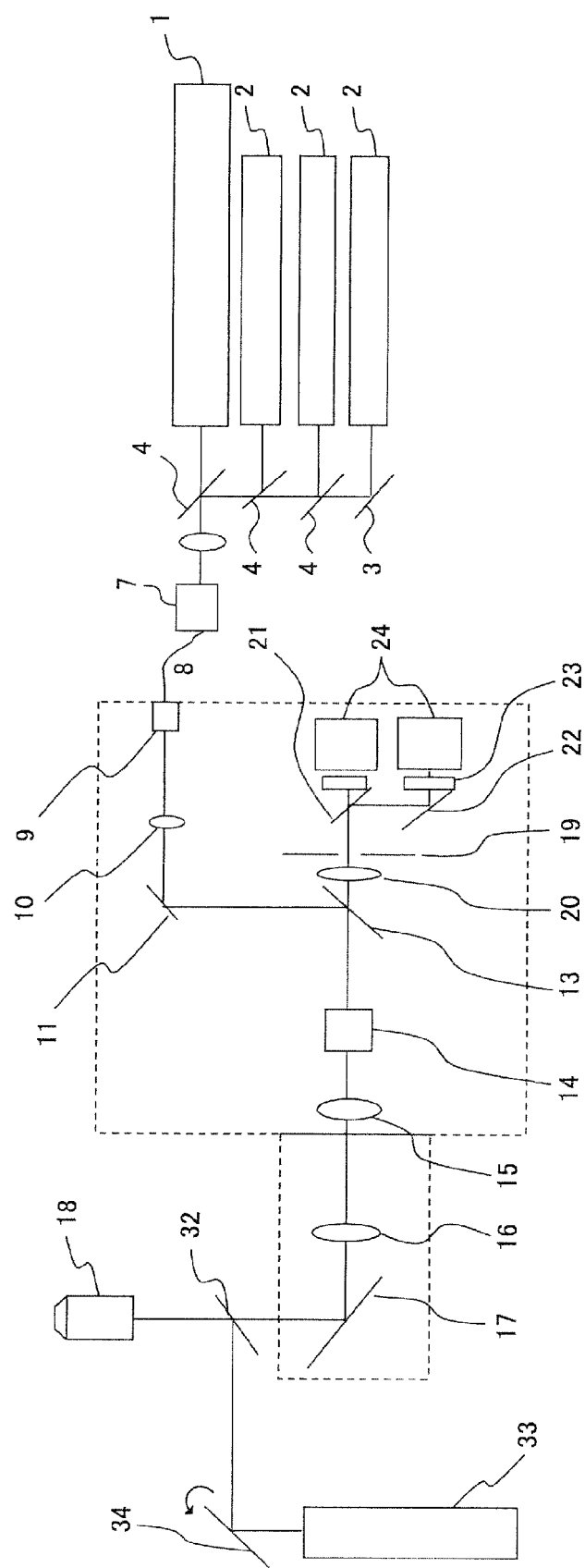
FIG. 28 shows the laser scanning type mirror focal microscope according to an embodiment of the present invention.

FIG. 28 shows an embodiment of the laser scanning microscope according to the present invention. Since the chromatic aberration of the objective according to the present embodiment is corrected in the wavelength range from 406 nm to 656 nm, the laser on the short wavelength laser and the visible laser can be handled similarly. Therefore, the single mode fiber 8 is used. The fiber can be a broadband fiber having a broad wavelength range available.

The beams from the fiber 8 are parallel beams through the collimator lens 10, and the visible laser and the laser on the short wavelength laser are combined into the same optical path by a half mirror or a dichroic mirror, and reflected by a dichroic mirror 13. The laser beam reflected by the dichroic mirror is scanned by a galvano-mirror 14, relayed by a pupil projection lens 15 and a tube lens 16, and led into an objective. The fluorescence from a specimen passes through an inverse optical path, passes through a dichroic mirror 13, and is condensed to a pinhole 19 for a confocal effect by a tube lens 20. After distributing the fluorescence that has passed through the pinhole 19 using a dichroic mirror 21, fluorescence in a desired wavelength range is detected by a photodetector 24 using a barrier filter 23. The reference numerals 3, 5, 11, 17, and 22 designate a mirror for bending an optical path.

It is further desired that the dichroic mirror 13 is a multiband dichroic mirror capable of reflecting lasers of a plurality of wavelengths without switching the dichroic mirror 13. When a dichroic mirror has a wedge, the condensing position is a little shifted on the sample surface by a switch of a dichroic mirror. However, using a multiband dichroic mirror, one dichroic mirror can process a plurality of lasers. Therefore, no switching is required, and no shift of the condensing position is detected on the sample surface by the wedge of the dichroic mirror. When a plurality of objectives is used, the conventional technology cannot correctly apply the chromatic aberration to a plurality of objectives. However, using the low chromatic aberration objective as one of the embodiments of the present invention, and with the configuration of the fluorescent observation apparatus, an observation has little error caused by chromatic aberration.

The objective according to the present embodiment compensates the chromatic aberration by itself. Therefore, it is advantageous when a laser beam is introduced between the objective 18 and the tube lens 16. When the chromatic aberration correction is performed by compensating for the tube lens 16 and the objective 18, there occurs a shift in a focal point is a laser etc. is introduced between the objective 18 and the tube lens 16. On the other hand, there is no shift occurring in the focal point according to the present embodiment in which the chromatic aberration correction is performed using only the objective. Therefore, it is advantageous when an observation is performed by a laser scanning microscope through a stimulus by a laser beam.

FIG. 28 shows the configuration of a stimulating laser 33 provided by arranging a dichroic mirror 32 between the objective 18 and the 17. In this example, a movable mirror 34 is provided for adjusting the irradiation position of the stimulating laser 33.

Figure 29:
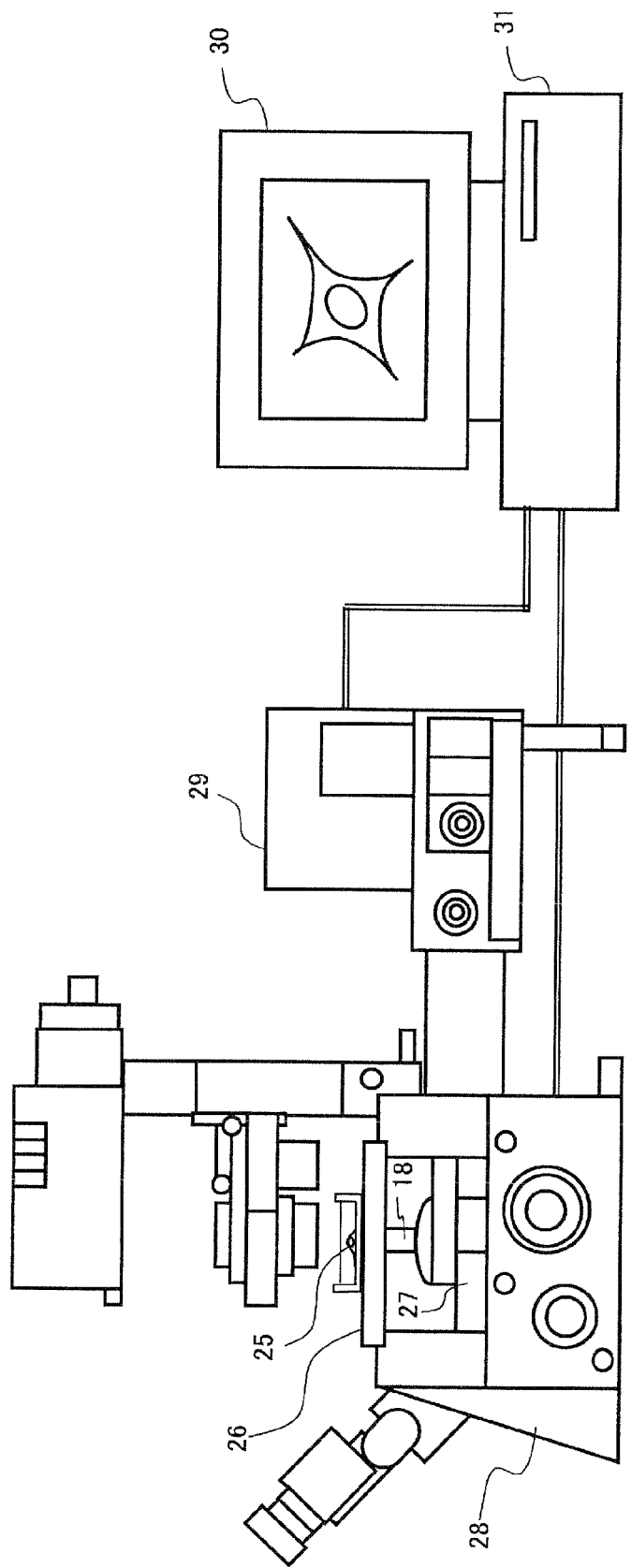
FIG. 29 shows the image processing system using the laser scanning type mirror focal microscope according to an embodiment of the present invention.

FIG. 29 shows an example of the configuration of the appearance of the laser scanning mirror focal microscope as an embodiment of the present invention. A specimen 25 is placed on a stage 26, and an objective 18 is attached to the revolver of a microscope body 28. A plurality of objectives can be attached to the revolver. The objective has an objective lift mechanism 27 that travels in the direction of the optical axis, and a plurality of sectional images of the specimen 25 in the direction of the optical axis can be obtained. To obtain a three-dimensional image of a specimen, a confocal scanner 29 is attached to a microscope body 28, and a galvano-scanner, a pin hole, etc. are arranged inside. Although not shown in the attached drawings, a laser light source is connected to the confocal scanner 29 through a fiber as shown in FIG. 27. A signal obtained by the confocal scanner 29 is transmitted to an image processing device 31, and displayed on an image display device 30. To generate a three-dimensional image of a specimen, the objective is moved in the direction of the optical axis, and a fluorescent image of a plurality of wavelengths is acquired. Each sectional image is stored in the image processing device 31, and a three-dimensional image of a specimen is displayed on the image display device 30.

Since the chromatic aberration is sufficiently corrected according to the present invention, there is no shift in the direction of the optical axis on a plurality of fluorescent images. Therefore, the sectional images of the specimen stored in the image processing device 31 and having a plurality of fluorescent wavelengths in the direction of the optical axis are superposed and displayed, correct three-dimensional images of the specimen can be obtained only by superposing the same sectional images different in wavelengths. Furthermore, when a fast movement of a molecule in a specimen is viewed, the configuration of the present embodiment requires no driving of an objective in the direction of the optical axis for chromatic aberration correction when a plurality of fluorescent images are superposed. Therefore, a fast movement of a molecule in a specimen can be observed.

Furthermore, the present invention is also effective in the fluorescent microscope and the fluorescent observation apparatus other than the confocal microscope. For example, there is an observation method of checking how a protein moves from the cell membrane by indicating the protein in a cell by fluorescent tags having different wavelengths. In this case, it is necessary to bring the cell membrane itself into the focus of a microscope. When there is axial chromatic aberration in the objective, the lens may go out of focus by different fluorescent tags, thereby observing a position shifted from the cell membrane by a different fluorescent wavelength. Also in this case, the same plane of a sample can be constantly observed using the objective as one of the embodiments of the present invention when fluorescent tags having different fluorescent wavelengths are used, thereby obtaining correct data.

Figure 30A:
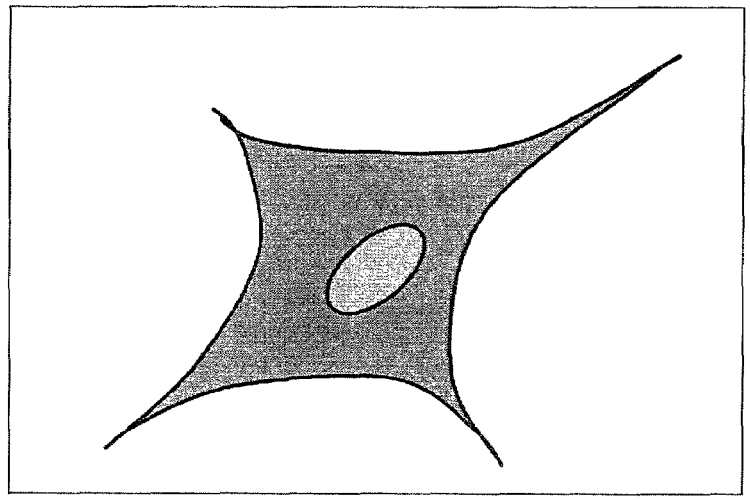
FIGS. 30A, 30B, and 30C show an example of the observation of the fluorescent resonant energy transfer (FRET) according to the present invention.
Figure 30B:
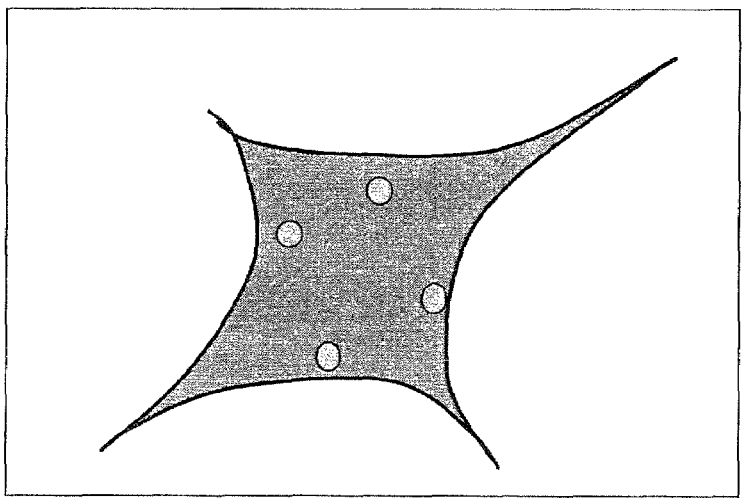
Figure 30C:
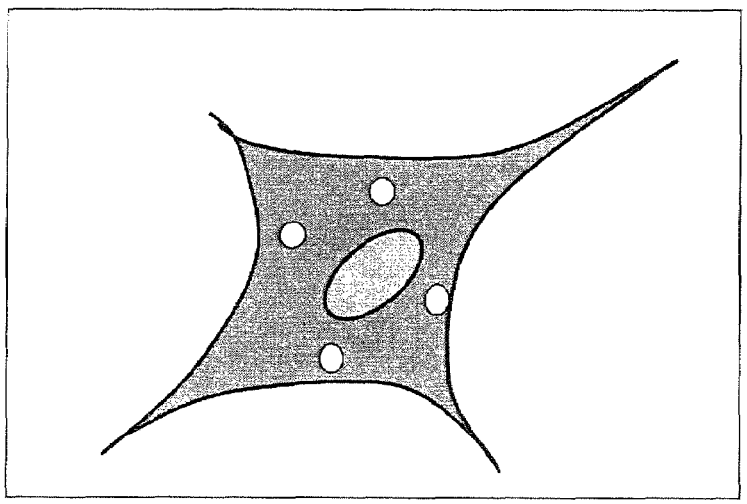

FIGS. 30A, 30B, and 30C show an example of observing the fluorescent resonant energy transfer (FRET) as an application of the fluorescent observation apparatus according to the embodiments of the present invention. In this observation, the density of the calcium ion in the cell is measured using, for example, the fluorescent probe of Cameleon. The Cameleon has the structure of two types of fluorescent protein of CFP and YFP coupled by the protein such as calmodulin-M etc. When the density of the calcium ion in the cell is low, only the fluorescence having the wavelength of 485 nm is emitted from the CFP when the excited light of 442 nm is emitted. However, if the density of the calcium ion becomes high, energy is transferred from the CFP to the YFP, and the fluorescence having the wavelength of 530 nm is observed as the fluorescence from the YFP. Based on the phenomenon, the ratio of the intensity of the fluorescence between the CFP and the YFP is measured, thereby measuring the density of the calcium ion.

A fluorescent microscope or a laser scanning microscope acquires an image by two wavelengths of 485 nm and 530 nm. For example, FIG. 30A shows an image of 485 nm, and FIG. 30B shows image of 530 nm. FIG. 30C shows the image for which the ratio of the brightness is obtained for each pixel of the images FIGS. 30A and 30B. The image FIG. 30C obtained in this operation has the information about the density of the calcium ion in the cell. As clearly shown in the above-mentioned procedure, it is necessary in this observation method to correctly associate the image acquired with a different wavelength with each pixel. The fluorescent observation apparatus according to the embodiments of the present invention is appropriate for the observation.

Described above is the fluorescent resonant energy transfer (FRET), but in the observation method of taking multiple values of fluorescence in measuring the calcium such as fura 2 etc., multiple values can be constantly taken on the same plane of a sample plane according to one of the embodiments of the present invention, thereby realizing a correct measurement.

What is claimed is:

1. A fluorescent observation apparatus, comprising:
a light source; a beam splitting device selectively reflecting light from the light source; an objective for illuminating or observing a specimen; a stage for fixing the specimen; a wavelength selection device for selecting a desired wavelength range based on rays that pass through the beam splitting device; and a detector for detecting light that passes through the wavelength selection device, wherein
the following conditions are satisfied:

$\lambda 1 - \lambda 2 \geq 180$ nm, $|\Delta 1 - \Delta 2| < 0.2$ μm, wherein $\lambda 1$ is the longest wavelength and $\lambda 2$ is the shortest wavelength in illuminating the specimen using two or more wavelengths, and $\Delta 1$ and $\Delta 2$ are the focal point on the optical axis of the objective with respect to $\lambda 1$ and $\lambda 2$ respectively.

2. The fluorescent observation apparatus according to claim 1, wherein
the following conditions is satisfied:

$\lambda 2 \leq 442$ nm.

3. The fluorescent observation apparatus according to claim 1, wherein
the following condition is satisfied:

$|\delta 1 - \delta 2| \leq 0.3$ μm where $\delta 1$ and $\delta 2$ indicate chromatic aberration of magnification of $\lambda 1$ and $\lambda 2$ respectively at field number 9.

4. The fluorescent observation apparatus according to claim 1, wherein:
the objective comprises, in order from the object side to an image side, a positive lens group Ga, a positive lens group Gb, a lens group Gc, a lens group Gd, and a lens group Ge;
the positive lens group Ga comprises a cemented lens obtained by cementing a plano-convex lens whose plane surface faces the object side and a meniscus lens whose concave surface faces the object side, and a positive single lens;
the positive lens group Gb is formed by a cemented lens;
the lens group Gc includes one or more cemented lens;
the lens group Gd includes a meniscus lens having a strongly concave surface that faces the image side;
the lens group Ge includes a negative lens having a strongly concave surface that faces the object side;
the lens group Gb is a cemented triplet lens including a positive lens, a negative lens, and a positive lens.

5. The fluorescent observation apparatus according to claim 4, wherein
the objective satisfies the following conditions:

$0.5 \leq H2/H1 \leq 0.75$, $7.8 \leq f(Gb)/f \leq 20$, wherein H1 indicates the ray height of the marginal ray emergent from the lens group Gb, H2 indicates the ray height of the marginal ray incident to the lens group Gd, f indicates the focal length of the entire objective, and f(Gb) indicates the focal length of the lens group Gb.

6. The fluorescent observation apparatus according to claim 5, wherein
the lens group Ge includes a negative lens Len whose concave surface faces the object side, and a positive lens Lep;
satisfying the following conditions:

$0.5 \leq H3/H1 \leq 0.65$, $45 \geq \text{vd}(\text{Len}) - \text{vd}(\text{Lep}) \geq 30$, wherein H3 is the ray height of a marginal ray emergent from the lens group Ge, vd(Len) is the Abbe number of the glass of the negative lens Len, and vd(Lep) is the Abbe number of the glass of the positive lens Lep.

7. The fluorescent observation apparatus according to claim 1, wherein
the objective compensates chromatic aberration by itself.

8. The fluorescent observation apparatus according to claim 1, further comprising:
an image storage device storing at least two images formed from a detection result by the detector when the specimen is illuminated using at least two excitation wavelengths light; and
an image analysis device for calculating the superposition, the difference, or the ratio of the images which are formed from the detection result.

9. The fluorescent observation apparatus according to claim 8, wherein:
the stage or the objective can be moved in the direction of the optical axis.

10. The fluorescent observation apparatus according to claim 1, further comprising:
a scanning device scanning a beam spot on the focal plane; and
a confocal detection device projecting the beam spot.

11. The fluorescent observation apparatus according to claim 10, wherein
a plurality of laser light sources are provided to combine lasers of plural wavelengths on the same optical path, and lead the combined lasers into the fluorescent observation apparatus by one optical fiber.

12. The fluorescent observation apparatus according to claim 10, wherein
an image of the specimen formed from a detection result of the detector when excitation is performed using a wavelength is output on a monitor, an area of a part of the image of the specimen is specified, light is emitted only to the specified portion and fluorescence bleaching is performed, a time change of a fluorescent image in the specified area or outside the specified area is recorded, and molecular dispersion in the specimen is detected.

13. The fluorescent observation apparatus according to claim 10, wherein
an image of a specimen formed from the detection result of the detector when excitation is performed using a wavelength is output on a monitor, an area of a part of the image of the specimen is specified, light is emitted only to the specified portion and the fluorescence dye in the specimen is activated, the time change of a fluorescent image in the specified area or outside the specified area is recorded, and a molecule in the specimen is analyzed.

14. The fluorescent observation apparatus according to claim 1, wherein with a specimen indicated by a plurality of fluorescent tags, the position information about the molecules in the specimen provided with two or more indicators is analyzed by superposing and outputting images obtained by the excitation wavelengths of λ1 and λ2.

15. The fluorescent observation apparatus according to claim 1, wherein a plurality of images formed from the detection result by the detector when the specimen is illuminated by the excitation wavelengths of λ1 and λ2 are acquired with the lapse of time, and the fluorescent resonant energy transfer between the molecules in the specimen is observed by obtaining a plurality of ratios of images by λ1 and λ2 with the lapse of time when the images are acquired at the same time.

16. The fluorescent observation apparatus according to claim 1, wherein a specimen image having two or more fluorescent tags is acquired; and brightness information about the obtained specimen image is expressed and plotted in a two-dimensional array for each pixel, thereby estimating localization of each molecule.

17. The fluorescent observation apparatus according to claim 1, wherein there is a molecule assigned to a plurality of fluorescent tags in the specimen, a plurality of excitation rays are simultaneously emitted, obtained fluorescence is separated and a fluorescent wavelength corresponding to λ1 and λ2 is detected, a time change of the detected fluorescence is recorded, and the speed of dispersion of a molecule in a specimen is obtained in a Fluorescence Correlation spectral method.

* * * * *